United States Patent
Christoffersson et al.

(10) Patent No.: US 12,096,478 B2
(45) Date of Patent: Sep. 17, 2024

(54) TWO-STEP RANDOM ACCESS PROCEDURE

(71) Applicant: Telefonaktiebolaget LM Ericsson (publ), Stockholm (SE)

(72) Inventors: Jan Christoffersson, Luleå (SE); Johan Axnäs, Solna (SE); Robert Mark Harrison, Grapevine, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 410 days.

(21) Appl. No.: 17/426,479

(22) PCT Filed: Feb. 11, 2020

(86) PCT No.: PCT/EP2020/053425
§ 371 (c)(1),
(2) Date: Jul. 28, 2021

(87) PCT Pub. No.: WO2020/165141
PCT Pub. Date: Aug. 20, 2020

(65) Prior Publication Data
US 2022/0110161 A1   Apr. 7, 2022

Related U.S. Application Data

(60) Provisional application No. 62/805,402, filed on Feb. 14, 2019.

(51) Int. Cl.
*H04W 74/0833* (2024.01)
*H04W 74/00* (2009.01)
*H04W 72/0446* (2023.01)

(52) U.S. Cl.
CPC ..... *H04W 74/0833* (2013.01); *H04W 74/008* (2013.01); *H04W 72/0446* (2013.01)

(58) Field of Classification Search
None
See application file for complete search history.

(56) References Cited

U.S. PATENT DOCUMENTS

2009/0067540 A1* 3/2009 Lee ............... H04W 74/004
   375/296
2011/0090918 A1* 4/2011 Umehara ........ H04L 5/0048
   370/442

(Continued)

FOREIGN PATENT DOCUMENTS

WO   2018064367 A1   4/2018
WO   2019088670 A1   5/2019

OTHER PUBLICATIONS

International Search Report and Written Opinion of the International Searching Authority for PCT International Application No. PCT/EP2020/053425 dated May 25, 2020.

(Continued)

*Primary Examiner* — Kenny S Lin
(74) *Attorney, Agent, or Firm* — Sage Patent Group

(57) ABSTRACT

A method is performed by a wireless device for accessing a network. The method comprises performing a two-step random access procedure. This comprises transmitting a preamble in at least one Physical Random Access Channel, PRACH, occasion, and transmitting a Physical Uplink Shared Channel, PUSCH. A position of the at least one PRACH occasion for transmitting the preamble is determined to ensure that a gap between transmitting the preamble and transmitting the PUSCH is less than a predetermined duration.

20 Claims, 15 Drawing Sheets

(56) References Cited

U.S. PATENT DOCUMENTS

| | | | |
|---|---|---|---|
| 2018/0368142 A1* | 12/2018 | Liou | H04W 74/0808 |
| 2018/0368188 A1 | 12/2018 | Aiba et al. | |
| 2019/0132882 A1* | 5/2019 | Li | H04W 74/0833 |
| 2019/0246412 A1* | 8/2019 | Noh | H04L 27/26 |
| 2020/0015236 A1* | 1/2020 | Kung | H04B 7/04 |
| 2020/0146063 A1* | 5/2020 | Xu | H04W 24/08 |
| 2020/0221504 A1* | 7/2020 | Cirik | H04L 1/1822 |
| 2020/0252973 A1* | 8/2020 | Zhang | H04W 76/18 |
| 2020/0275492 A1* | 8/2020 | Lei | H04W 56/0045 |
| 2021/0127356 A1* | 4/2021 | Agiwal | H04B 17/318 |
| 2021/0297969 A1* | 9/2021 | Myung | H04W 74/0816 |
| 2021/0298090 A1* | 9/2021 | Myung | H04W 74/0833 |
| 2021/0320821 A1* | 10/2021 | Lee | H04W 56/00 |
| 2021/0329634 A1* | 10/2021 | Kim | H04L 27/26 |
| 2022/0022259 A1* | 1/2022 | Atungsiri | H04L 1/08 |
| 2022/0132580 A1* | 4/2022 | Ohara | H04W 74/002 |
| 2022/0338246 A1* | 10/2022 | Ohara | H04W 74/0866 |

OTHER PUBLICATIONS

3GPP TS 38.211 V15.4.0, "3rd Generation Partnership Project; Technical Specification Group Radio Access Network; NR; Physical channels and modulation (Release 15)," Technical Specification, Dec. 2018, 96 pages.

3GPP TS 38.321 V15.4.0, "3rd Generation Partnership Project; Technical Specification Group Radio Access Network; NR; Medium Access Control (MAC) protocol specification (Release 15)," Technical Specification, Dec. 2018, 77 pages.

3GPP TS 38.213 V15.4.0, "3rd Generation Partnership Project; Technical Specification Group Radio Access Network; NR; Physical layer procedures for control (Release 15)," Technical Specification, Dec. 2018, 104 pages.

3GPP TS 38.331 V15.4.0, "3rd Generation Partnership Project; Technical Specification Group Radio Access Network; NR; Radio Resource Control (RRC) protocol specification (Release 15)," Technical Specification, Dec. 2018, 471 pages.

* cited by examiner

TWO-STEP RANDOM ACCESS PROCEDURE

Cross Reference to Related Applications

This application is a 35 U.S.C. § 371 national stage application of PCT International Application No. PCT/EP2020/053425 filed on Feb. 11, 2020, which claims the benefit of U.S. Provisional Patent Application Serial No. 62/805,402, filed on Feb. 14, 2019, the disclosures and content of which are incorporated by reference herein in their entireties.

TECHNICAL FIELD

This relates to a method performed by a wireless device for performing a random access.

BACKGROUND

Next generation systems are expected to support a wide range of use cases with varying requirements ranging from fully mobile devices to stationary Internet of Things (IoT) or fixed wireless broadband devices. In New Radio, NR, both licensed assisted access and standalone unlicensed operation are to be supported in 3GPP. Hence the procedure of Physical Random Access Channel (PRACH) transmission in unlicensed spectrum is of interest. In the following, a channel sensing scheme based on Listen-before-talk (LBT), a random access procedure and an LBT scheme for PRACH is introduced as a basis to address the solutions.

In order to tackle the ever increasing data demand, NR considers both licensed and unlicensed spectrum. NR-based Access to Unlicensed Spectrum is referred to as NR-U. NR-U should support dual connectivity (DC) and standalone scenarios, where the Media Access Control (MAC) procedures including Random Access Channel (RACH) and scheduling procedures on unlicensed spectrum are subject to LBT failures.

Listen-before-talk (LBT) is designed for unlicensed spectrum co-existence with other Radio Access Technologies (RATs). In this mechanism, a radio device or User Equipment (UE) device, applies a clear channel assessment (CCA) check before any transmission. The transmitter involves energy detection (ED) over a time period compared to a certain threshold (ED threshold) in order to determine if a channel is idle. If the channel is determined to be occupied, the transmitter performs a random back-off within a contention window before the next CCA attempt. In order to protect the Acknowledgement (ACK) transmissions, the transmitter must defer a period after each busy CCA slot prior to resuming back-off.

As soon as the transmitter has grasped access to a channel (that is, LBT was successful), the transmitter is only allowed to perform transmission up to a maximum time duration, the maximum channel occupancy time (MCOT). The transmissions during the channel occupancy time (COT) may not have any gaps longer than 16 µs. In case there is a gap longer than 16 µs, the UE needs to perform a new LBT before continuing with the transmission.

For Quality of Service (QoS) differentiation, a channel access priority based on the service type has been defined. For example, four LBT priority classes are defined for differentiation of contention window sizes (CWS) and MCOT between services.

At 3GPP RAN1#80, the LBT categories have been defined as:
Category 1: No LBT
Category 2: LBT without random back-off
Category 3: LBT with random back-off with fixed size of contention window
Category 4: LBT with random back-off with variable size of contention window FIG. 1 is a signalling diagram, illustrating the legacy 4-step Random Access (RA) procedure 100 used in both Long Term Evolution (LTE) networks, and NR, when a UE wishes to access a base station, or eNB.

The UE randomly selects a preamble which it transmits at step 102 within a set of time and frequency resources that are identified for Physical random Access Channel (PRACH) transmission, and which are designated as a 'PRACH occasion' (RO). As discussed in 3GPP TS 38.211, rev. 15.4.0, Rel-15, ROs are an integer multiple of OFDM symbols long, and there can be multiple consecutive ROs within a subframe. PRACH slots are defined that contain one or more ROs, where each PRACH slot starts in a designated symbol within a subframe. If the PRACH subcarrier spacing is 30 kHz or less, there are at most 2 PRACH slots in a subframe in Rel-15.

When the eNB detects the preamble, it estimates the timing advance that the UE should use in order to obtain uplink (UL) synchronisation at the eNB. At step 104, the eNB responds to the UE with the TA, and a grant of resources on which the UE may transmit.

At step 106, in Msg3, the UE transmits its identifier.

At step 108, the eNB responds by acknowledging the UE id in Msg 4. The Msg 4 provides contention resolution. That is, only one UE's identifier will be sent in Msg 4, even if several UEs have used the same preamble (and Msg 3) simultaneously.

In LTE, the 4-step RA procedure cannot be completed in less than 14 ms (or equivalently 14 TTIs or 14 subframes).

In the legacy four step procedure shown in FIG. 1, one of the main usages of the first two messages 102, 104 is to obtain UL time alignment for the UE. In many situations, e.g. in small cells or for stationary UEs, this may not be needed, since either a zero timing advance (TA) will be sufficient (for example in the case of small cells), or a stored TA value from the last random access (RA) could serve also for the current RA (for example in the case of a stationary UE). In future radio networks it can be expected that these situations are common, both due to dense deployments of small cells and a great number of stationary devices such as IoT devices. Thus, it has been considered that a possibility to skip the message exchange to obtain the TA value would lead to reduced RA latency and would be beneficial in several use cases, for example when transmitting infrequent small data packets.

It has therefore been proposed that a two-step procedure may be used, where the UL messages (PRACH+Msg3) are sent simultaneously (or at least without any intermediate response from the eNB), and similarly the two DL messages (e.g. the time advance, or TA, command in the Random Access Response, RAR, and the contention resolution information) are sent as a simultaneous response in the DL.

A 2-step Random Access procedure potentially gives much shorter latency than the ordinary 4-step RA shown in FIG. 1.

As described above, a UE performing a 2-step RA may transmit MsgA after one successful LBT if there is no transmission gap between the preamble and the PUSCH part of MsgA. However, it has now been recognized that a problem which will occur in some PRACH configurations is that the preamble transmission is in the beginning of the slot and the PUSCH transmission is in the following slot. In this case, the transmission gap will typically be larger than 16 μs, forcing the UE to perform a new LBT and facing the risk of losing access to the channel. In this case, the latency of the 2-step RA procedure is increased, and so the expected benefit of the 2-step RA procedure does not arise.

SUMMARY

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

According to a first aspect, there is provided a method performed by a wireless device for accessing a network. The method comprises performing a two-step random access procedure comprising transmitting a preamble in at least one Physical Random Access Channel, PRACH, occasion, and transmitting a Physical Uplink Shared Channel, PUSCH. A position of the at least one PRACH occasion for transmitting the preamble is determined to ensure that a gap between transmitting the preamble and transmitting the PUSCH is less than a predetermined duration.

References herein to a "position" are referring to a time position within a subframe, or within a transmission more generally.

The position of the at least one PRACH occasion may be determined to be the last PRACH occasion within a slot before the PUSCH.

The position of the at least one PRACH occasion may be determined to be the last PRACH occasion within a first slot for transmitting the preamble, and the method may further comprise transmitting the PUSCH within a second slot immediately following the first slot.

The method may comprise transmitting the PUSCH starting at a starting symbol after the first symbol of a first slot, and determining the position of the last PRACH occasion in said first slot such that it finishes before said starting symbol for transmitting the preamble.

The method may comprise transmitting the preamble in a PRACH occasion within a first slot and repeating transmission of the preamble in at least one subsequent PRACH occasion within said first slot.

The method may comprise repeating transmission of the preamble in each subsequent PRACH occasion within said first slot, and transmitting the PUSCH within a second slot immediately following the first slot.

The method may comprise transmitting the PUSCH starting at a starting symbol after the first symbol of a first slot, transmitting the preamble in a PRACH occasion before said starting symbol within the first slot, and repeating transmission of the preamble in at least one subsequent PRACH occasion until the last PRACH occasion in said first slot that finishes before said starting symbol.

The method may comprise transmitting the preamble in a PRACH occasion within a first slot and extending a duration of the preamble.

The method may comprise extending the duration of the preamble by cyclically repeating a preamble sequence.

The method may comprise extending a duration of the preamble until a time less than the predetermined duration before an end of said first slot, and transmitting the PUSCH within a second slot immediately following the first slot.

The method may comprise transmitting the PUSCH starting at a starting symbol after the first symbol of a first slot, transmitting the preamble in a PRACH occasion before said starting symbol within the first slot and extending the duration of the preamble until a time less than the predetermined duration before said starting symbol.

The method may comprise: transmitting the preamble in a PRACH occasion within a first slot; repeating transmission of the preamble in at least one subsequent PRACH occasion within said first slot; and extending a duration of at least one transmission of the preamble.

The method may comprise extending the duration of at least one transmission of the preamble by cyclically repeating a preamble sequence.

The method may comprise extending a duration of at least one transmission of the preamble until a time less than the predetermined duration before an end of said first slot, and transmitting the PUSCH within a second slot immediately following the first slot.

The method may comprise transmitting the PUSCH starting at a starting symbol after the first symbol of a first slot, transmitting the preamble in a PRACH occasion before said starting symbol within the first slot, repeating transmission of the preamble in at least one subsequent PRACH occasion within said first slot, and extending the duration of at least one transmission of the preamble until a time less than the predetermined duration before said starting symbol.

The method may comprise transmitting the preamble starting at a first symbol in a first slot, such that a gap between an end of the preamble and am end of the first slot is less than the predetermined duration.

The method may comprise performing said two-step random access procedure in response to receiving signaling configuring the wireless device to perform a random access procedure. Said signaling may indicate that the wireless device should perform said two-step random access procedure in preference to a four-step random access procedure. Said signaling may identify resources in which the PUSCH should be transmitted.

Said predetermined duration may be a maximum gap in a channel occupancy time.

A subset of the RACH occasions in a PRACH configuration available in 3GPP NR Rel-15 may be allowed for use in the RACH procedure in unlicensed operation.

The method may further comprise: providing user data; and forwarding the user data to a host computer via the transmission to the base station.

According to a further aspect, there is provided a wireless device, configured to perform a method according to the first aspect.

According to a second aspect, there is provided a method in a base station for controlling a random access procedure. The method comprises configuring the wireless device for a random access procedure comprising transmitting a preamble in at least one Physical Random Access Channel, PRACH, occasion, and transmitting a Physical Uplink Shared Channel, PUSCH. The method further comprises configuring the wireless device to transmit the preamble in the at least one PRACH occasion such that a gap between the preamble and the PUSCH is less than a predetermined duration.

Said configuring may comprise sending a message within broadcast system information. Said message may be carried in RACH-ConfigCommon.

Said configuring may comprise sending a message to the wireless device in dedicated RRC signaling.

Said message may include an identifier of the PRACH preamble.

Said message may allow identification of resources to be used for the PUSCH transmission.

The method of the second aspect may further comprise: obtaining user data; and forwarding the user data to a host computer or a wireless device.

According to a further aspect, there is provided a base station, configured to perform a method according to the second aspect.

According to a further aspect, there is provided a wireless device, the wireless device comprising: processing circuitry configured to perform any of the steps of any method according to the first aspect; and power supply circuitry configured to supply power to the wireless device.

According to a further aspect, there is provided a base station, the base station comprising: processing circuitry configured to perform any of the steps of any method according to the second aspect; and power supply circuitry configured to supply power to the base station.

According to a further aspect there is provided a user equipment, UE, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the methods according to the first aspect;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

According to a further aspect, there is provided a communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the methods according to the second aspect.

The communication system may further include the base station.

The communication system may further include the UE, wherein the UE is configured to communicate with the base station.

In the communication system,
the processing circuitry of the host computer may be configured to execute a host application, thereby providing the user data; and
the UE may comprise processing circuitry configured to execute a client application associated with the host application.

According to a further aspect, there is provided a method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the methods according to the second aspect.

The method may further comprise, at the base station, transmitting the user data.

The user data may be provided at the host computer by executing a host application, the method further comprising, at the UE, executing a client application associated with the host application.

According to a further aspect, there is provided a user equipment, UE, configured to communicate with a base station, the UE comprising a radio interface and processing circuitry configured to perform the methods of the previous aspect.

According to a further aspect, there is provided a communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the methods according to the first aspect.

The cellular network may further include a base station configured to communicate with the UE.

In the communication system:
the processing circuitry of the host computer may be configured to execute a host application, thereby providing the user data; and
the UE's processing circuitry is configured to execute a client application associated with the host application.

According to a further aspect, there is provided a method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any method according to the first aspect.

The method may further comprise, at the UE, receiving the user data from the base station.

According to a further aspect, there is provided a communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any method according to the first aspect.

The communication system may further include the UE.

The communication system may further include the base station, wherein the base station comprises a radio interface configured to communicate with the UE and a communication interface configured to forward to the host computer the user data carried by a transmission from the UE to the base station.

In the communication system:
the processing circuitry of the host computer may be configured to execute a host application; and
the UE's processing circuitry may be configured to execute a client application associated with the host application, thereby providing the user data.

In the communication system:
the processing circuitry of the host computer may be configured to execute a host application, thereby providing request data; and
the UE's processing circuitry may be configured to execute a client application associated with the host application, thereby providing the user data in response to the request data.

According to a further aspect, there is provided a method implemented in a communication system including a host computer, a base station and a user equipment (UE), the method comprising:
at the host computer, receiving user data transmitted to the base station from the UE, wherein the UE performs any of the steps of any method according to the first aspect.

The method may further comprise, at the UE, providing the user data to the base station.

The method may further comprise:
at the UE, executing a client application, thereby providing the user data to be transmitted; and
at the host computer, executing a host application associated with the client application.

The method may further comprise:
at the UE, executing a client application; and
at the UE, receiving input data to the client application, the input data being provided at the host computer by executing a host application associated with the client application,
wherein the user data to be transmitted is provided by the client application in response to the input data.

According to a further aspect, there is provided a communication system including a host computer comprising a communication interface configured to receive user data originating from a transmission from a user equipment (UE) to a base station, wherein the base station comprises a radio interface and processing circuitry, the base station's processing circuitry configured to perform any of the steps of any method according to the second aspect.

The communication system of the previous embodiment may further include the base station.

The communication system may further include the UE, wherein the UE is configured to communicate with the base station.

In the communication system:
the processing circuitry of the host computer may be configured to execute a host application;
the UE may be configured to execute a client application associated with the host application, thereby providing the user data to be received by the host computer.

According to a further aspect, there is provided a method implemented in a communication system including a host computer, a base station and a user equipment (UE), the method comprising:
at the host computer, receiving, from the base station, user data originating from a transmission which the base station has received from the UE, wherein the UE performs any of the steps of any method according to the first aspect.

The method may further comprise, at the base station, receiving the user data from the UE.

The method may further comprise, at the base station, initiating a transmission of the received user data to the host computer.

Certain embodiments may provide one or more technical advantages.

Specifically, some embodiments may allow performance of the 2-step random access procedure with improved latency, because a negative impact due to LBT failure on UL data transfer and UL RACH performance may be eliminated, and thus a minimum latency for MsgA (including both preamble and PUSCH) transmission, for both licensed and unlicensed operation, may be assured.

BRIEF DESCRIPTION OF THE DRAWINGS

Reference will now be made, by way of example, to the accompanying drawings, in which.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As discussed above, a 2-step Random Access procedure has been proposed, as a way of reducing the latency of the Random Access procedure compared with the conventional 4-step Random Access procedure.

Figure 1:
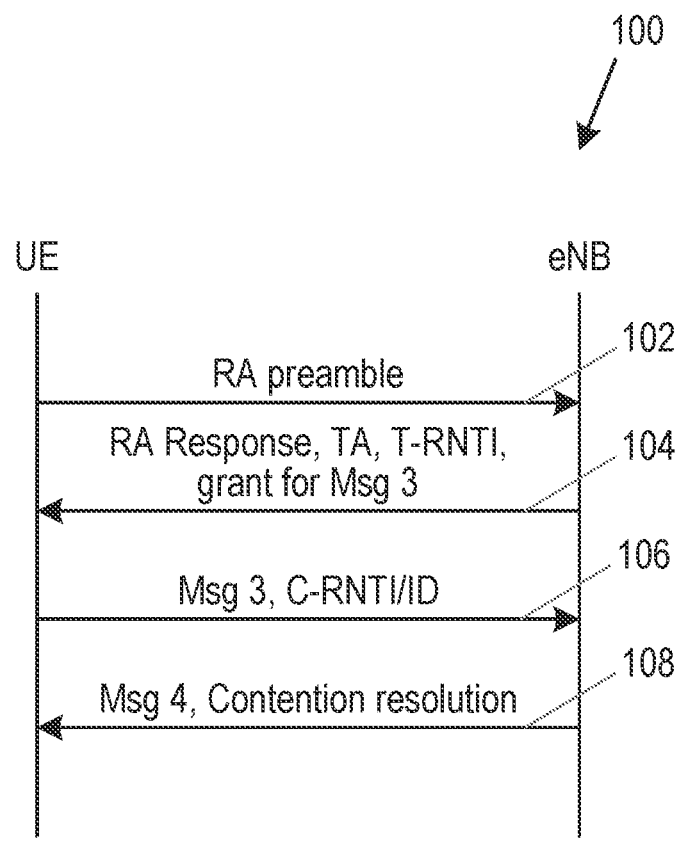
FIG. 1 is a signalling diagram, illustrating a conventional random access procedure.
Figure 2:
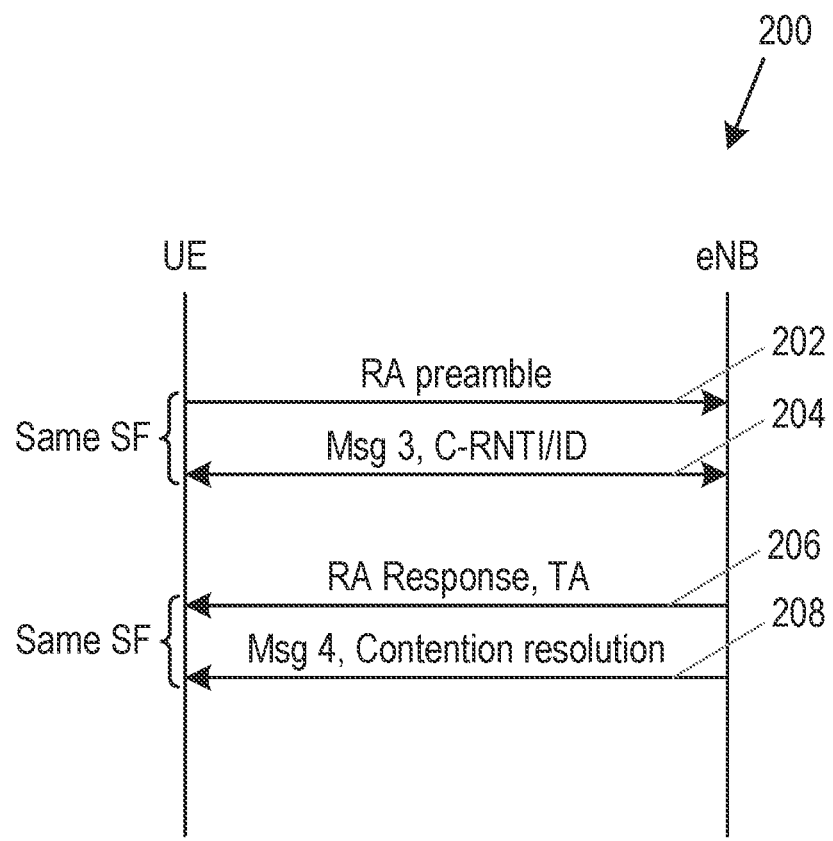
FIG. 2 is a signalling diagram, illustrating a random access procedure in accordance with one aspect of the procedure.

FIG. 2 is a signalling diagram, illustrating a 2-step Random Access procedure 200, performed when a UE wishes to access a base station, or eNB.

Specifically, the UE randomly selects a preamble which it transmits at step 202 within a set of time and frequency resources that are identified for Physical random Access Channel (PRACH) transmission, and which are designated as a 'PRACH occasion' (RO).

At step 204, the UE transmits a message corresponding to Message 3 (Msg 3) of the 4-step RA procedure, in which it includes its identifier. This message is transmitted on the Physical Uplink Shared Channel (PUSCH).

The preamble is transmitted on the PRACH, and the PUSCH is transmitted, in the same slot, or in two consecutive slots.

The preamble and Msg 3 are together referred to as Message A (MsgA) in NR-U.

Upon successful reception of MsgA, the eNB will respond with timing advance information 206 (which by assumption should not be needed or just give very minor updates) and a Msg 4 208 for contention resolution.

Again, RA response 206 and the Msg 4 208 are transmitted in the same slot, or in two consecutive sub frames.

The RA response 206 and the Msg 4 208 are together referred to as Message B (MsgB).

As noted above, one main benefit for NR-U of the 2-step procedure is the ability to reduce the number of LBTs needed to complete the procedure. Once the UE has performed a successful LBT, it may use the channel for the maximum allowed channel occupancy time (COT) if there is no transmission gap larger than 16 μs. Thus, the 2-step procedure for NR-U may not need 4 LBTs to be completed as is the case for the 4-step procedure.

For all different preamble IDs that have been configured for the 2-step procedure, there must be a mapping to a particular PUSCH resource. The PUSCH resource may be time multiplexed, frequency multiplexed or code multiplexed. For example, the PRACH and PUSCH resource may both be time multiplexed (TDM).

The preamble format used for the 2-step RA procedure is configured in system information (SI) together with the PRACH occasions (RO) which are given by the prach-ConfigurationIndex.

Figure 3:
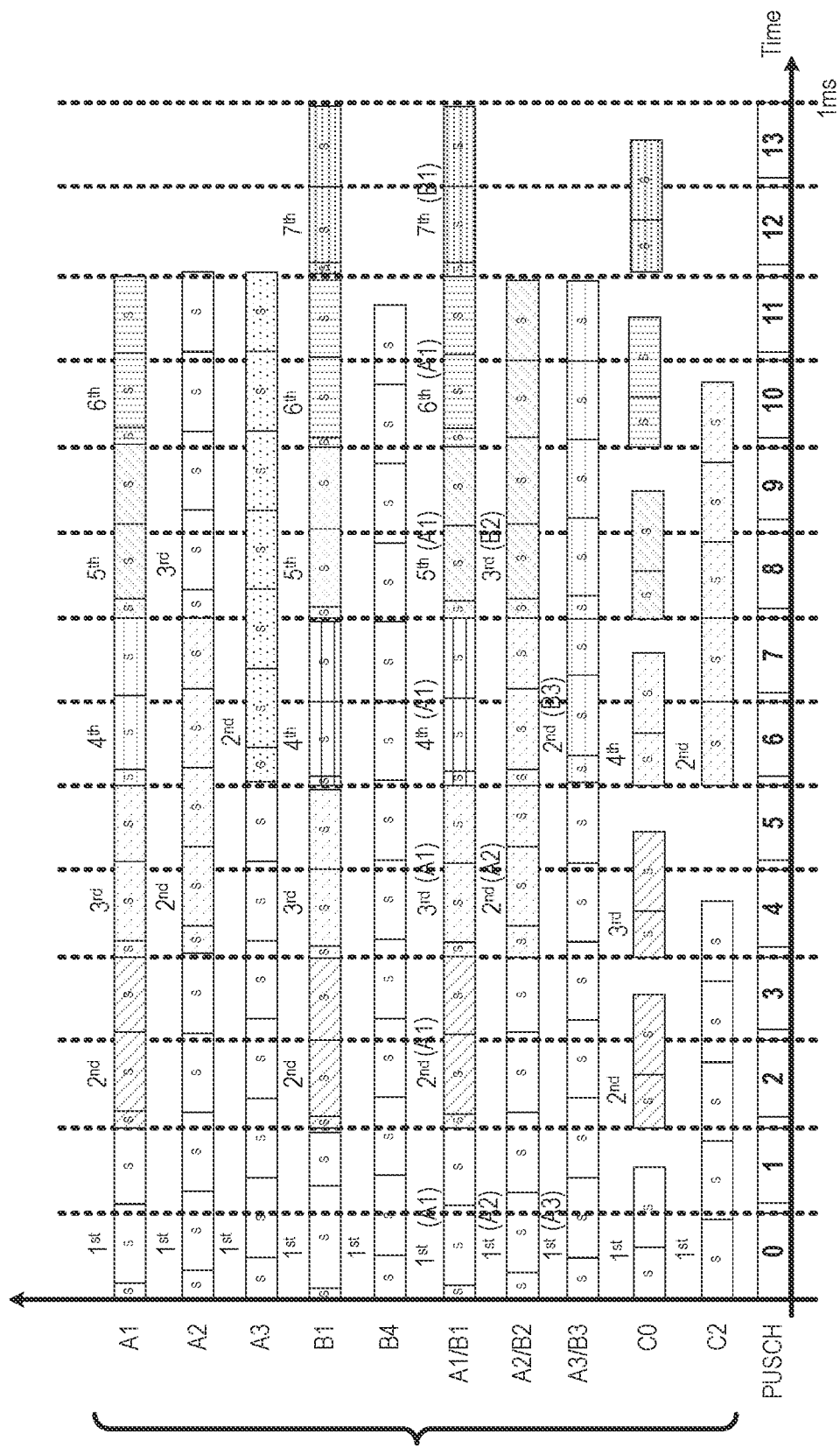
FIG. 3 illustrates PRACH occasions.

FIG. 3 illustrates examples of how the preamble formats can be allocated in a slot in Rel-15 according to section 6.3.3.2 of 3GPP TS 38.211 rev. 15.4.0. In general a cyclic prefix is followed by a sequence part, with an optional guard period.

Thus, for example, assuming a 15 kHz subcarrier spacing (different subcarrier spacings give different durations), FIG. 3 shows the preamble format A1, in which a cyclic prefix period $T_{CP}$, nominally of 288 basic timing units (where the basic timing unit $T_s=1/30720000$ s), is followed by $2 \times T_{SEQ}$, where $T_{SEQ}$ is the duration of one Zadoff-Chu sequence, and there are six PRACH occasions (that is, the 1st, 2nd, 3rd, 4th, 5th and 6th occasions) in the 1 ms slot.

FIG. 3 also shows the preamble format A2, in which a $576T_s$ $T_{CP}$ is followed by $4 \times T_{SEQ}$, and there are three PRACH occasions (that is, the 1st, 2nd and 3rd occasions) in the slot.

FIG. 3 also shows the preamble format A3, in which a $864T_s$ $T_{CP}$ is followed by $6 \times T_{SEQ}$, and there are two PRACH occasions (that is, the 1st and 2nd occasions) in the slot.

FIG. 3 also shows the preamble format B1, in which a $216T_s$ $T_{CP}$ is followed by $2 \times T_{SEQ}$ and a $72T_s$ guard period, and there are seven PRACH occasions (that is, the 1st, 2nd, 3rd, 4th, 5th, 6th and 7th occasions) in the slot.

FIG. 3 also shows preamble format B4, in which a $936T_s$ $T_{CP}$ is followed by $12 \times T_{SEQ}$ and a $792T_s$ guard period, and there is one PRACH occasion (that is, the 1st occasion) in the slot.

FIG. 3 also shows hybrid preamble formats, such as the A1/B1, in which the 1st, 2nd, 3rd, 4th, 5th and 6th A1 occasions are followed by the 7th B1 occasion.

As described above, one issue with the proposed 2-step RA procedure is that the gap between the preamble transmission and the PUSCH transmission may be greater than 16 μs.

Figure 4:
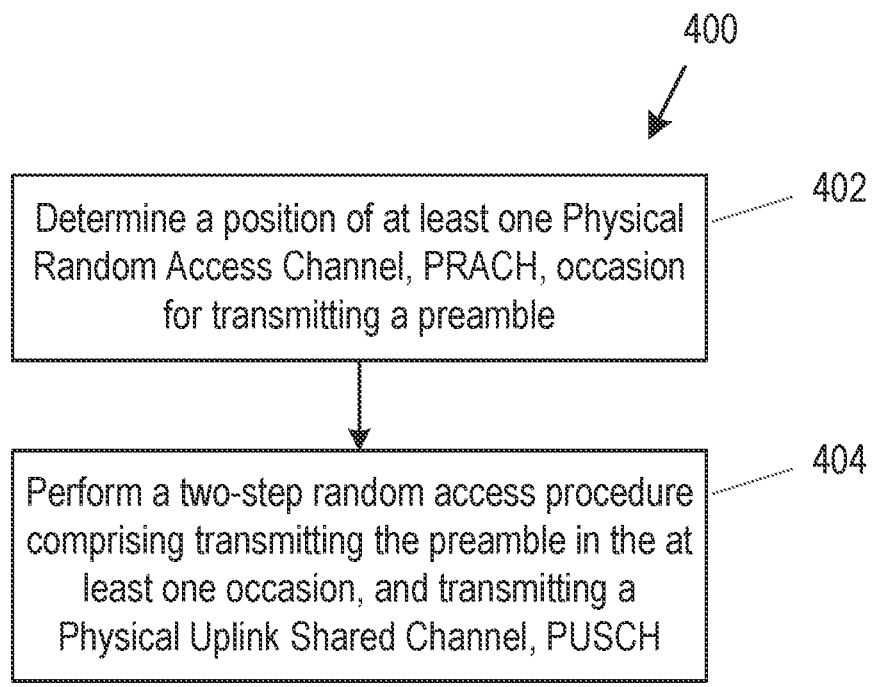
FIG. 4 is a flow chart showing a method performed by a wireless device for accessing a cell of a network.

FIG. 4 is a flow chart illustrating a method 400 performed by a wireless device for accessing a network in accordance with particular embodiments.

The method begins at step 402 with the wireless device determining at least one Physical Random Access Channel, PRACH, occasion.

The wireless device may determine the at least one occasion by selecting the at least one occasion itself. Alternatively, the wireless device may determine the at least one occasion from information supplied to it by a base station of the radio access network.

At step 404, the wireless device performs a two-step random access procedure comprising transmitting a preamble in the determined at least one PRACH, occasion, and transmitting a Physical Uplink Shared Channel, PUSCH.

The at least one PRACH occasion for transmitting the preamble is selected or determined in such a way as to ensure that a gap between transmitting the preamble and transmitting the PUSCH is less than a predetermined duration. Thus, the predetermined duration acts as a threshold.

The predetermined duration may be the maximum gap that is allowed before a UE needs to perform a new LBT before continuing with the transmission. In the examples described above, this may be 16 μs.

Figure 5:
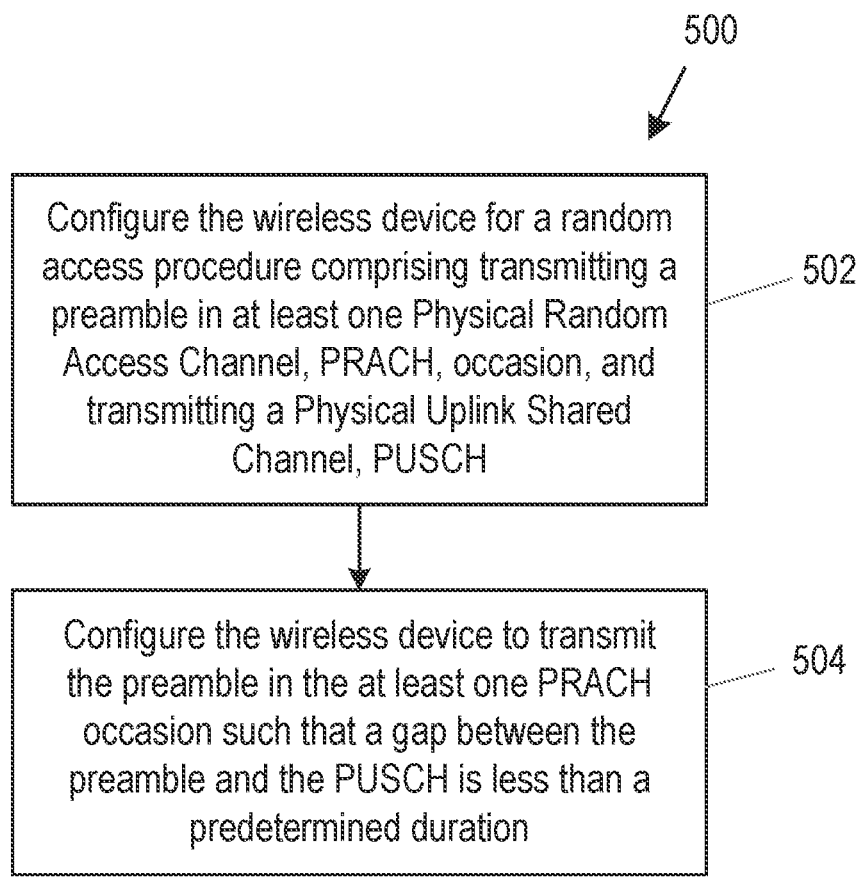
FIG. 5 is a flow chart showing a method performed by a network node for allowing a wireless device to access a cell of a network.

FIG. 5 is a flow chart showing a method 500 performed by a base station in accordance with particular embodiments for configuring a wireless device.

In step 502 the base station causes a message to be sent to a wireless device, said message causing the wireless device to use a two-step random access procedure when accessing a cell served by the base station. That is, the message configures the wireless device for a random access procedure comprising transmitting a preamble in at least one Physical Random Access Channel, PRACH, occasion, and transmitting a Physical Uplink Shared Channel, PUSCH.

In step 504, the base station configures the wireless device to transmit the preamble in the at least one PRACH occasion such that a gap between the preamble and the PUSCH is less than a predetermined duration.

In embodiments described in more detail herein, the aim of determining the at least one PRACH occasion for transmitting the preamble, to ensure that a gap between transmitting the preamble and transmitting the PUSCH is less than a predetermined duration, can be achieved in different ways.

One possibility is to allow the UE to choose a later (for example, the last) PRACH occasion, or RO, within the slot, another possibility is to allow the UE to use consecutive PRACH occasions within a slot to remove the gap which would otherwise occur, and another possibility is to prolong a preamble to reach the slot border, or define new PRACH configuration tables which remove gaps.

There is also described a new timing mechanism where PRACH slots have lengths that are non-integer multiples of 7 symbols. These PRACH slots can start and end at multiple positions within a subframe, and so even short preambles can be immediately prior to a PUSCH transmission, thereby minimizing the time to transmit both the preamble and PUSCH associated with a given Msg A.

Thus, in one embodiment, when PRACH occasions occupy nearly all of a PRACH slot and immediately precede symbols where a PUSCH transmission can begin, there is disclosed a method in a wireless device or UE comprising:
  a. receiving signalling configuring the UE to transmit a random access transmission, the transmission comprising a PRACH preamble and an associated PUSCH;
  b. transmitting the PRACH, wherein
    i. the PRACH occupies the entirety of a transmission occasion except for at most a length of time T, and
    ii. the next OFDM symbol after the transmission occasion is a symbol in which a PUSCH transmission may be allocated; and
  c. transmitting the associated PUSCH beginning in an OFDM symbol after the transmission occasion.

More specifically, the UE may transmit a PUSCH in the next opportunity. Thus, the embodiment above may further comprise:
  a. transmitting the PUSCH in the PUSCH resources associated with the PRACH, wherein the transmission begins in the next OFDM symbol following the transmission occasion.

More specifically, the PRACH preamble and PUSCH resources may be associated. Thus, this embodiment may further comprise determining an association between resources used for a PRACH transmission and resources used for a PUSCH transmission, the PUSCH transmission being identified at least in part by the PRACH transmission.

More specifically, Msg A may have defined periodicity. Thus, the embodiment above may further comprise receiving signalling identifying time and frequency resources in which the associated PUSCH may be transmitted, wherein the time resources occur periodically. Further, configured grant resources may be used for the Msg A PUSCH. Thus, the time and frequency resources may be identified by parameters carried in configuredGrantConfig of 3GPP TS 38.331 rev. 15.4.0.

In one embodiment, the UE is mandated to select the last RO before the PUSCH transmission in a MsgA transmission for NR-U. This may be the last RO in a slot or, if the PUSCH is transmitted in a mini-slot within a slot (that is, if the PUSCH transmission starts in a symbol other than the first symbol of a slot), the last RO before that mini-slot.

For example, referring to FIG. 3, if (for example) preamble format B1 is used and the UE could use any of the 1st-7th RO, it would be mandated to use the 7th RO.

The 3GPP specification 38.321 v15.4.0, at section 5.1.2, relating to the Medium Access Control indicates that "the MAC entity shall select a PRACH occasion randomly with equal probability amongst the consecutive PRACH occasions . . . ". The UE could be mandated to select the last RO by changing this to state that "the MAC entity shall select the last PRACH occasion within a slot or the last PRACH occasion wherein the corresponding MsgA PUSCH transmission is done according to subclause 8.1 of TS 38.213 [6], corresponding to the selected SSB; the MAC entity may take into account the possible occurrence of measurement gaps when determining the next available PRACH occasion corresponding to the selected SSB".

In a further embodiment, repeated preamble transmission is allowed within a slot up to the end of the slot. In this case, if (for example) preamble format B1 is used and the UE could use any of the 1st-7th RO, and if the 5th RO is selected, the UE could repeat the preamble transmission in the 6th and 7th occasions. This would enable the UE to start the preamble transmission as soon as it has a successful LBT and to hold the channel until the PUSCH transmission, without any gaps greater than the predetermined duration occurring, and hence without requiring the UE to perform another LBT.

As an alternative or complement to transmitting additional preambles, the UE may extend the duration of a preamble (e.g. by cyclically repeating the preamble sequence) up to the end of the slot.

If mini-slots are used, the preamble repetition and/or cyclic extension could occur only up to the first symbol of the mini-slot used for PUSCH.

Figure 6:
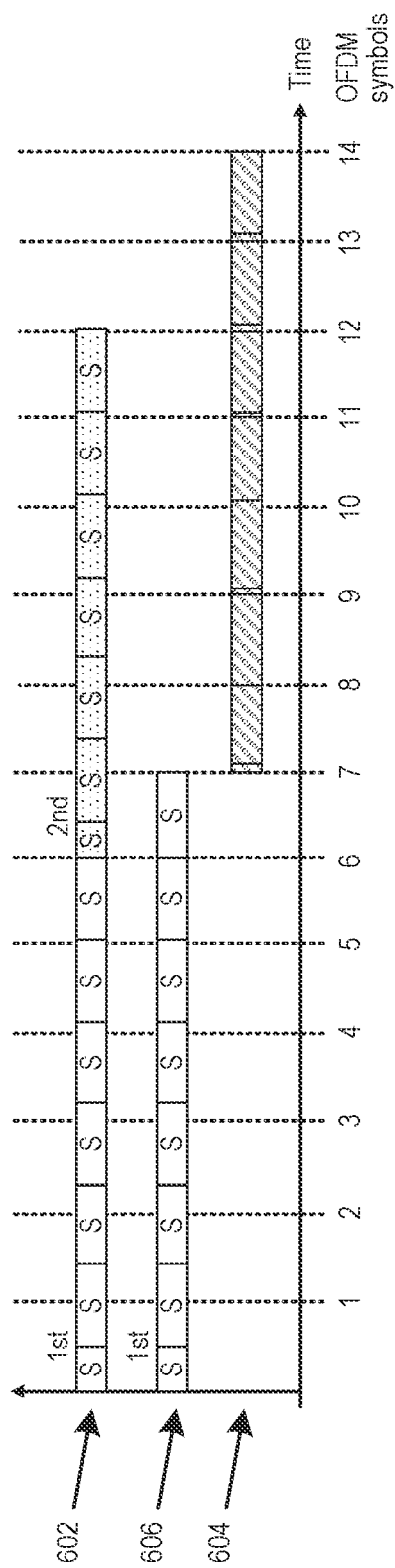
FIG. 6 illustrates the operation of the method of FIG. 4, in one example.

FIG. 6 illustrates one example of this embodiment.

Specifically, FIG. 6 illustrates the extension of a preamble to avoid a gap between the preamble and a "mini-slot" PUSCH.

Thus, FIG. 6 shows a situation where preamble format A3 is being used, and so, as shown at 602 in FIG. 6, there are two PRACH occasions in the slot, namely the 1st occasion starting at OFDM symbol 0 and the 2nd occasion starting at OFDM symbol 6.

As shown at 604, the PUSCH transmission takes place in a mini-slot, starting at OFDM symbol 7 of the time slot.

In this example, the 1st PRACH occasion, extending for OFDM symbols 0-5, is selected.

As shown at 606, in order to ensure that there is no gap between the transmission of the preamble on the PRACH and the transmission on the PUSCH, the transmission of the preamble on the PRACH is extended so that it also occupies OFDM symbol 6 of the time slot.

Thus, the UE is not required to perform another LBT before the PUSCH transmission.

A further possibility within this embodiment is to allow repeated preamble transmission, and then if necessary extend the duration of a preamble (e.g. by cyclically repeating the preamble sequence) up to the end of the slot.

One situation where this might be applicable, for example, is a situation where preamble format A1 is being used, and there are six PRACH occasions in the slot, starting at OFDM symbols 0, 2, 4, 6, 8 and 10 respectively. The first of these six PRACH occasions, extending for OFDM symbols 0-1 is selected, and the PUSCH transmission takes place in a mini-slot, starting at OFDM symbol 7 of the time slot. In order to ensure that there is no gap between the transmission of the preamble on the PRACH and the transmission on the PUSCH, the preamble may be repeated in the 1st, 2nd, and 3rd PRACH occasions, as shown in FIG. 3, occupying OFDM symbols 0 and 1, OFDM symbols 2 and 3, and OFDM symbols 4 and 5, respectively. Further, the third transmission of the preamble on the PRACH is extended so that it also occupies OFDM symbol 6 of the time slot.

In a further embodiment, new PRACH configuration tables could be extended from those in Rel-15, such as Tables 6.3.3.2-3 and 6.3.3.2-4 in 3GPP TS 38.211 rev.

15.4.0, where the extension is such that the PRACH starting symbol is chosen so that the end of the preamble transmission is aligned with the slot boundary. This could also be partly achieved by defining masking index tables so that only some of the RO in the current PRACH configurations are allowed in the 2-step RA in NR-U. As a variant, existing tables could be modified selectively. Such modification could be explicit changes for selected cells, or in the form of more general rules for interpreting the table differently, e.g. stating that irrespective of the value in the "starting symbol" columns, the actual starting symbol of the preamble should always be selected so that a preamble ends at the end of the slot (or before first symbol of a mini-slot).

Since two-step RACH operation for licensed spectrum also commonly strives to minimize latency by transmitting PRACH and MsgA PUSCH close together in time, it can be similar to that of unlicensed operation. Therefore, some embodiments may be used for paired as well as unpaired spectrum. In this case, some embodiments may extend table 6.3.3.2-2 of 3GPP TS 38.211 rev. 15.4.0 using the methods described in the context of unlicensed operation above.

In all of the above embodiments, instead of having preamble transmission up to the end of the slot or up to the start of the first symbol of a mini-slot used for PUSCH, the preamble transmission could be made to stop $\Delta T$ earlier, where $\Delta T$ is preferably <16 μs so that no additional LBT is needed. Preamble formats B1, B2, and B3 stop 2.3, 7.0, and 11.7 μs, respectively, before the beginning of the following symbol and so these meet the requirement that $\Delta T$ is preferably <16 μs and could be used in some embodiments.

In some embodiments, a PRACH slot is defined such that PRACH transmission in any PRACH occasion within the PRACH slot occupies the entire PRACH slot except for at most 16 μs. In some embodiments, the PRACH slot is the duration of one of the PRACH preamble formats, and occupies an integer number of OFDM symbols. For example, a PRACH slot could be 2 symbols long and contain format A1 or B1, but not format C0 since format C0 has a gap of 35.7 μs. Similarly, a PRACH slot could be 4 or 6 symbols long and contain formats A2 or B2 for 4 symbol PRACH slots and formats A3 or B3 for 6 symbol PRACH slots.

When the PRACH subcarrier spacing is 30 kHz or less, Rel-15 PRACH configurations contain at most 2 PRACH slots per subframe. This limits the number of positions within a subframe that a PUSCH could be transmitted, since it should be transmitted after a PRACH slot. Therefore, it is desirable to define more than two PRACH slots in a subframe, since PUSCH could be transmitted immediately after a PRACH slot at more than two positions in a subframe, thereby allowing more PRACH+PUSCH MsgA transmissions to be multiplexed within a subframe.

A PRACH slot could be defined to start in a symbol relative to the beginning of a subframe, or alternatively, the beginning of a radio frame. The start can be defined as an offset in units of OFDM symbols, and the offset between two adjacent slots can be an integer multiple of the number of symbols in the PRACH slot. In this way, multiple PRACH slots can be present within a subframe or radio frame. The PRACH slots may be described using a PRACH configuration, the PRACH configuration comprising one or more of a preamble format, a position within a plurality of subframes, a subframe number, a starting symbol, a number of PRACH slots within a subframe, a number of time domain PRACH occasions within a subframe, and a PRACH duration, In some embodiments, the PRACH slots are described by adding rows to one or more of Tables 6.3.3.2-3 and 6.3.3.2-4 of 3GPP TS 38.211 rev. 15.4.0.

In some embodiments not targeting unlicensed operation, a PRACH slot is alternatively defined such that it is an integer number of OFDM symbols, but may not transmit PRACH for a duration longer than 16 μs. For example, a PRACH slot could be 2 symbols long and contain format A1, B1, or C0. Such PRACH slot definitions may be described by adding rows to Table 6.3.3.2-2 of 3GPP TS 38.211 rev. 15.4.0.

The resources where the UE should transmit the PUSCH associated with the preamble can be signalled to the UE using a similar mechanism to that used in PUSCH configured grant operation. In some embodiments, the UE is provided an identifier of a PRACH preamble such as a random access preamble index defined in 3GPP TS 38.213 rev. 15.4.0, and this PRACH preamble identifier is associated with a PUSCH configuration. This may allow a transmission in PUSCH resources to be identified as coming from a UE that transmitted the associated PRACH preamble. One or more of the parameters given in configuredGrantConfig described in 3GPP TS 38.331 and in 3GPP TS 38.213 section 6.1.2.3 may be used to construct the PUSCH configuration. The timeDomainOffset parameter can identify a symbol for which a grant is considered to have occurred, as described in 3GPP TS 38.321 section 5.8. The parameter timeDomainAllocation parameter can be used to provide the equivalent of the Time domain resource assignment field value m conveyed by DCI, which is used to determine the OFDM symbols used to carry PUSCH based on the slot in which the grant is considered to have occurred, the procedures in 3GPP TS 38.213 sections 6.1.2.3 and 6.1.2.1. In some embodiments, timeDomainAllocation may preferably indicate an OFDM symbol immediately following the associated PRACH occasion. Additional parameters provided by configuredGrantConfig, such as frequencyDomainAllocation, antennaPort, dmrs-SeqInitialization, precodingAndNumberOfLayers, mcsAndTBS, frequencyHoppingOffset, pathlossReferenceIndex may also be used in the configuration, following the behavior described for configured grant PUSCH transmission in 3GPP TS 38.214 section 6.1.2.3.

Since cells will generally support both 2-step and 4-step RACH operation, the UE may need to receive signalling to configure it to transmit two step RACH. This two-step RACH signalling that activates two step RACH operation in the UE can be added to system information (such as being carried in RACH-ConfigCommon), or it can be directly signalled to the UE in dedicated RRC signalling. The signalling will at least instruct the UE to use 2-step RACH transmission comprising a RACH preamble and a PUSCH transmission when it uses a RACH procedure toward the cell that provided the signalling or a cell identified in the signalling.

Figure 7:
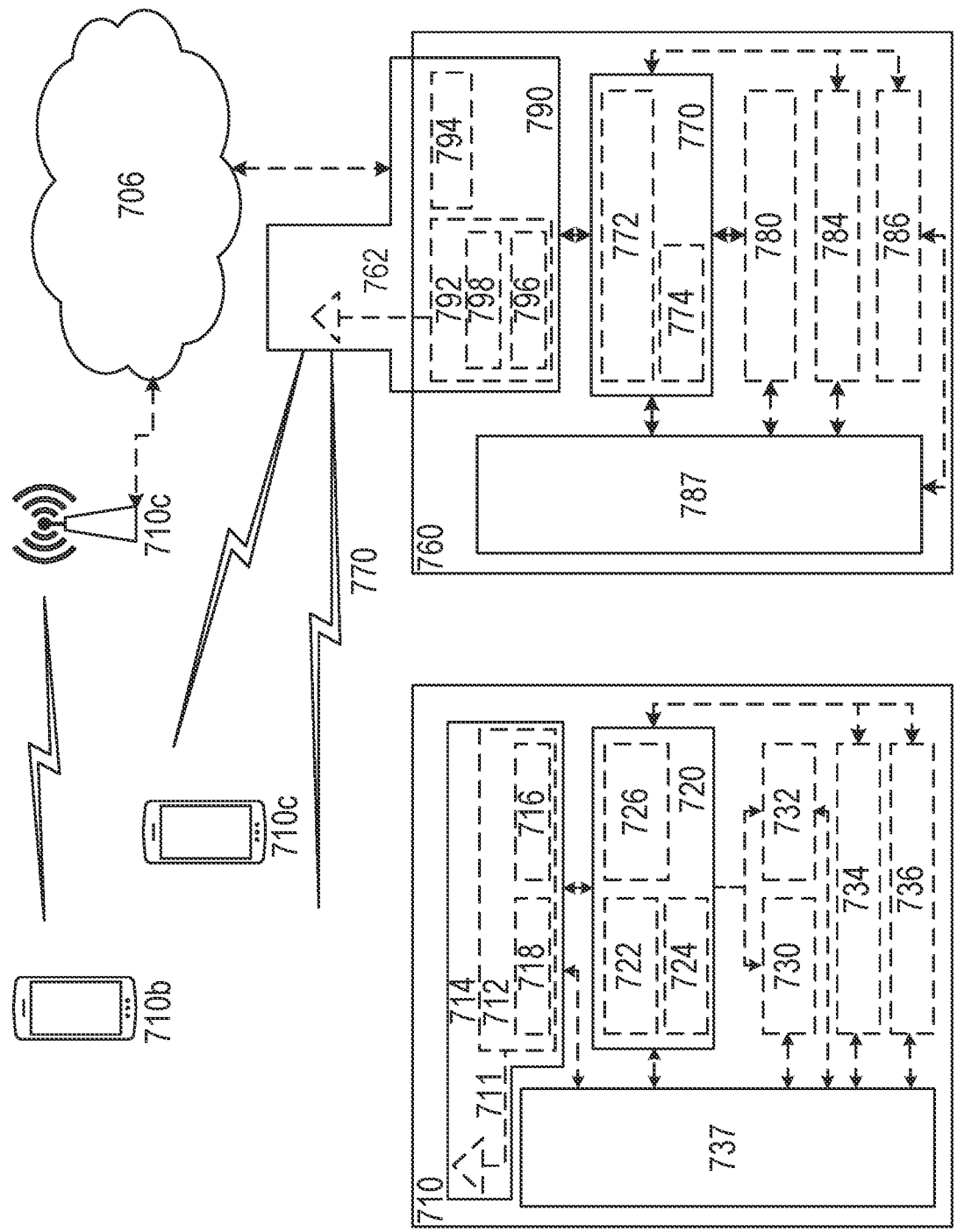
FIG. 7 shows a wireless network in accordance with some embodiments.

FIG. 7 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 706, network nodes 760 and 760b, and WDs 710, 710b, and 710c. In practice, a wireless network may further include any additional elements suitable to support communication between wireless devices or between a wireless device and another communication device, such as a landline telephone, a service provider, or any other network node or end device. Of the illustrated components, network node 760 and wireless device (WD) 710 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 706 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 760 and WD 710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 760 includes processing circuitry 770, device readable medium 780, interface 790, auxiliary equipment 784, power source 786, power circuitry 787, and antenna 762. Although network node 760 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 760 are depicted as single boxes located within a larger box, or nested within multiple boxes, in practice, a network node may comprise multiple different physical components that make up a single illustrated component (e.g., device readable medium 780 may comprise multiple separate hard drives as well as multiple RAM modules).

Similarly, network node 760 may be composed of multiple physically separate components (e.g., a NodeB component and a RNC component, or a BTS component and a BSC component, etc.), which may each have their own respective components. In certain scenarios in which network node 760 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 760 may be configured to support multiple radio access technologies (RATs). In such embodiments, some components may be duplicated (e.g., separate device readable medium 780 for the different RATs) and some components may be reused (e.g., the same antenna 762 may be shared by the RATs). Network node 760 may also include multiple sets of the various illustrated components for different wireless technologies integrated into network node 760, such as, for example, GSM, WCDMA, LTE, NR, WiFi, or Bluetooth wireless technologies. These wireless technologies may be integrated into the same or different chip or set of chips and other components within network node 760.

Processing circuitry 770 is configured to perform any determining, calculating, or similar operations (e.g., certain obtaining operations) described herein as being provided by a network node. These operations performed by processing circuitry 770 may include processing information obtained by processing circuitry 770 by, for example, converting the obtained information into other information, comparing the obtained information or converted information to information stored in the network node, and/or performing one or more operations based on the obtained information or converted information, and as a result of said processing making a determination.

Processing circuitry 770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 760 components, such as device readable medium 780, network node 760 functionality. For example, processing circuitry 770 may execute instructions stored in device readable medium 780 or in memory within processing circuitry 770. Such functionality may include providing any of the various wireless features, functions, or benefits discussed herein. In some embodiments, processing circuitry 770 may include a system on a chip (SOC).

In some embodiments, processing circuitry 770 may include one or more of radio frequency (RF) transceiver circuitry 772 and baseband processing circuitry 774. In some embodiments, radio frequency (RF) transceiver circuitry 772 and baseband processing circuitry 774 may be on separate chips (or sets of chips), boards, or units, such as radio units and digital units. In alternative embodiments, part or all of RF transceiver circuitry 772 and baseband processing circuitry 774 may be on the same chip or set of chips, boards, or units.

In certain embodiments, some or all of the functionality described herein as being provided by a network node, base station, eNB or other such network device may be performed by processing circuitry 770 executing instructions stored on device readable medium 780 or memory within processing circuitry 770. In alternative embodiments, some or all of the functionality may be provided by processing circuitry 770 without executing instructions stored on a separate or discrete device readable medium, such as in a hard-wired manner. In any of those embodiments, whether executing instructions stored on a device readable storage medium or not, processing circuitry 770 can be configured to perform the described functionality. The benefits provided by such functionality are not limited to processing circuitry 770 alone or to other components of network node 760, but are enjoyed by network node 760 as a whole, and/or by end users and the wireless network generally.

Device readable medium 780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 770. Device readable medium 780 may store any suitable instructions, data or information, including a computer program, software, an application including one or more of logic, rules, code, tables, etc. and/or other instructions capable of being executed by processing circuitry 770 and, utilized by network node 760. Device readable medium 780 may be used to store any calculations made by processing circuitry 770 and/or any data received via interface 790. In some embodiments, processing circuitry 770 and device readable medium 780 may be considered to be integrated.

Interface 790 is used in the wired or wireless communication of signalling and/or data between network node 760, network 706, and/or WDs 710. As illustrated, interface 790 comprises port(s)/terminal(s) 794 to send and receive data, for example to and from network 706 over a wired connection. Interface 790 also includes radio front end circuitry 792 that may be coupled to, or in certain embodiments a part of, antenna 762. Radio front end circuitry 792 comprises filters 798 and amplifiers 796. Radio front end circuitry 792 may be connected to antenna 762 and processing circuitry 770. Radio front end circuitry may be configured to condition signals communicated between antenna 762 and processing circuitry 770. Radio front end circuitry 792 may receive digital data that is to be sent out to other network nodes or WDs via a wireless connection. Radio front end circuitry 792 may convert the digital data into a radio signal having the appropriate channel and bandwidth parameters using a combination of filters 798 and/or amplifiers 796. The radio signal may then be transmitted via antenna 762. Similarly, when receiving data, antenna 762 may collect radio signals which are then converted into digital data by radio front end circuitry 792. The digital data may be passed to processing circuitry 770. In other embodiments, the interface may comprise different components and/or different combinations of components.

In certain alternative embodiments, network node 760 may not include separate radio front end circuitry 792, instead, processing circuitry 770 may comprise radio front end circuitry and may be connected to antenna 762 without separate radio front end circuitry 792. Similarly, in some embodiments, all or some of RF transceiver circuitry 772 may be considered a part of interface 790. In still other embodiments, interface 790 may include one or more ports or terminals 794, radio front end circuitry 792, and RF transceiver circuitry 772, as part of a radio unit (not shown), and interface 790 may communicate with baseband processing circuitry 774, which is part of a digital unit (not shown).

Antenna 762 may include one or more antennas, or antenna arrays, configured to send and/or receive wireless signals. Antenna 762 may be coupled to radio front end circuitry 790 and may be any type of antenna capable of transmitting and receiving data and/or signals wirelessly. In some embodiments, antenna 762 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 762 may be separate from network node 760 and may be connectable to network node 760 through an interface or port.

Antenna 762, interface 790, and/or processing circuitry 770 may be configured to perform any receiving operations and/or certain obtaining operations described herein as being performed by a network node. Any information, data and/or signals may be received from a wireless device, another network node and/or any other network equipment. Similarly, antenna 762, interface 790, and/or processing circuitry 770 may be configured to perform any transmitting operations described herein as being performed by a network node. Any information, data and/or signals may be transmitted to a wireless device, another network node and/or any other network equipment.

Power circuitry 787 may comprise, or be coupled to, power management circuitry and is configured to supply the components of network node 760 with power for performing the functionality described herein. Power circuitry 787 may receive power from power source 786. Power source 786 and/or power circuitry 787 may be configured to provide power to the various components of network node 760 in a form suitable for the respective components (e.g., at a voltage and current level needed for each respective component). Power source 786 may either be included in, or external to, power circuitry 787 and/or network node 760. For example, network node 760 may be connectable to an external power source (e.g., an electricity outlet) via an input circuitry or interface such as an electrical cable, whereby the external power source supplies power to power circuitry 787. As a further example, power source 786 may comprise a source of power in the form of a battery or battery pack which is connected to, or integrated in, power circuitry 787. The battery may provide backup power should the external power source fail. Other types of power sources, such as photovoltaic devices, may also be used.

Alternative embodiments of network node 760 may include additional components beyond those shown in FIG. 7 that may be responsible for providing certain aspects of the network node's functionality, including any of the functionality described herein and/or any functionality necessary to support the subject matter described herein. For example, network node 760 may include user interface equipment to allow input of information into network node 760 and to allow output of information from network node 760. This may allow a user to perform diagnostic, maintenance, repair, and other administrative functions for network node 760.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 710 includes antenna 711, interface 714, processing circuitry 720, device readable medium 730, user interface equipment 732, auxiliary equipment 734, power source 736 and power circuitry 737. WD 710 may include multiple sets of one or more of the illustrated components for different wireless technologies supported by WD 710, such as, for example, GSM, WCDMA, LTE, NR, WiFi, WiMAX, or Bluetooth wireless technologies, just to mention a few. These wireless technologies may be integrated into the same or different chips or set of chips as other components within WD 710.

Antenna 711 may include one or more antennas or antenna arrays, configured to send and/or receive wireless signals, and is connected to interface 714. In certain alternative embodiments, antenna 711 may be separate from WD 710 and be connectable to WD 710 through an interface or port. Antenna 711, interface 714, and/or processing circuitry 720 may be configured to perform any receiving or transmitting operations described herein as being performed by a WD. Any information, data and/or signals may be received from a network node and/or another WD. In some embodiments, radio front end circuitry and/or antenna 711 may be considered an interface.

As illustrated, interface 714 comprises radio front end circuitry 712 and antenna 711. Radio front end circuitry 712 comprise one or more filters 718 and amplifiers 716. Radio front end circuitry 714 is connected to antenna 711 and processing circuitry 720, and is configured to condition signals communicated between antenna 711 and processing circuitry 720. Radio front end circuitry 712 may be coupled to or a part of antenna 711. In some embodiments, WD 710 may not include separate radio front end circuitry 712; rather, processing circuitry 720 may comprise radio front end circuitry and may be connected to antenna 711. Similarly, in some embodiments, some or all of RF transceiver circuitry 722 may be considered a part of interface 714. Radio front end circuitry 712 may receive digital data that is to be sent out to other network nodes or WDs via a wireless connection. Radio front end circuitry 712 may convert the digital data into a radio signal having the appropriate channel and bandwidth parameters using a combination of filters 718 and/or amplifiers 716. The radio signal may then be transmitted via antenna 711. Similarly, when receiving data, antenna 711 may collect radio signals which are then converted into digital data by radio front end circuitry 712. The digital data may be passed to processing circuitry 720. In other embodiments, the interface may comprise different components and/or different combinations of components.

Processing circuitry 720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 710 components, such as device readable medium 730, WD 710 functionality. Such functionality may include providing any of the various wireless features or benefits discussed herein. For example, processing circuitry 720 may execute instructions stored in device readable medium 730 or in memory within processing circuitry 720 to provide the functionality disclosed herein.

As illustrated, processing circuitry 720 includes one or more of RF transceiver circuitry 722, baseband processing circuitry 724, and application processing circuitry 726. In other embodiments, the processing circuitry may comprise different components and/or different combinations of components. In certain embodiments processing circuitry 720 of WD 710 may comprise a SOC. In some embodiments, RF transceiver circuitry 722, baseband processing circuitry 724, and application processing circuitry 726 may be on separate chips or sets of chips. In alternative embodiments, part or all of baseband processing circuitry 724 and application processing circuitry 726 may be combined into one chip or set of chips, and RF transceiver circuitry 722 may be on a separate chip or set of chips. In still alternative embodiments, part or all of RF transceiver circuitry 722 and baseband processing circuitry 724 may be on the same chip or set of chips, and application processing circuitry 726 may be on a separate chip or set of chips. In yet other alternative embodiments, part or all of RF transceiver circuitry 722, baseband processing circuitry 724, and application processing circuitry 726 may be combined in the same chip or set of chips. In some embodiments, RF transceiver circuitry 722 may be a part of interface 714. RF transceiver circuitry 722 may condition RF signals for processing circuitry 720.

In certain embodiments, some or all of the functionality described herein as being performed by a WD may be provided by processing circuitry 720 executing instructions stored on device readable medium 730, which in certain embodiments may be a computer-readable storage medium. In alternative embodiments, some or all of the functionality may be provided by processing circuitry 720 without executing instructions stored on a separate or discrete device readable storage medium, such as in a hard-wired manner. In any of those particular embodiments, whether executing instructions stored on a device readable storage medium or not, processing circuitry 720 can be configured to perform the described functionality. The benefits provided by such functionality are not limited to processing circuitry 720 alone or to other components of WD 710, but are enjoyed by WD 710 as a whole, and/or by end users and the wireless network generally.

Processing circuitry 720 may be configured to perform any determining, calculating, or similar operations (e.g., certain obtaining operations) described herein as being performed by a WD. These operations, as performed by processing circuitry 720, may include processing information obtained by processing circuitry 720 by, for example, converting the obtained information into other information, comparing the obtained information or converted information to information stored by WD 710, and/or performing one or more operations based on the obtained information or converted information, and as a result of said processing making a determination.

Device readable medium 730 may be operable to store a computer program, software, an application including one or more of logic, rules, code, tables, etc. and/or other instructions capable of being executed by processing circuitry 720. Device readable medium 730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 720. In some embodiments, processing circuitry 720 and device readable medium 730 may be considered to be integrated.

User interface equipment 732 may provide components that allow for a human user to interact with WD 710. Such interaction may be of many forms, such as visual, audial, tactile, etc. User interface equipment 732 may be operable to produce output to the user and to allow the user to provide input to WD 710. The type of interaction may vary depending on the type of user interface equipment 732 installed in WD 710. For example, if WD 710 is a smart phone, the interaction may be via a touch screen; if WD 710 is a smart meter, the interaction may be through a screen that provides usage (e.g., the number of gallons used) or a speaker that provides an audible alert (e.g., if smoke is detected). User interface equipment 732 may include input interfaces, devices and circuits, and output interfaces, devices and circuits. User interface equipment 732 is configured to allow input of information into WD 710, and is connected to processing circuitry 720 to allow processing circuitry 720 to process the input information. User interface equipment 732 may include, for example, a microphone, a proximity or other sensor, keys/buttons, a touch display, one or more cameras, a USB port, or other input circuitry. User interface equipment 732 is also configured to allow output of information from WD 710, and to allow processing circuitry 720 to output information from WD 710. User interface equipment 732 may include, for example, a speaker, a display, vibrating circuitry, a USB port, a headphone interface, or other output circuitry. Using one or more input and output interfaces, devices, and circuits, of user interface equipment 732, WD 710 may communicate with end users and/or the wireless network, and allow them to benefit from the functionality described herein.

Auxiliary equipment 734 is operable to provide more specific functionality which may not be generally performed by WDs. This may comprise specialized sensors for doing measurements for various purposes, interfaces for additional types of communication such as wired communications etc. The inclusion and type of components of auxiliary equipment 734 may vary depending on the embodiment and/or scenario.

Power source 736 may, in some embodiments, be in the form of a battery or battery pack. Other types of power sources, such as an external power source (e.g., an electricity outlet), photovoltaic devices or power cells, may also be used. WD 710 may further comprise power circuitry 737 for delivering power from power source 736 to the various parts of WD 710 which need power from power source 736 to carry out any functionality described or indicated herein. Power circuitry 737 may in certain embodiments comprise power management circuitry. Power circuitry 737 may additionally or alternatively be operable to receive power from an external power source; in which case WD 710 may be connectable to the external power source (such as an electricity outlet) via input circuitry or an interface such as an electrical power cable. Power circuitry 737 may also in certain embodiments be operable to deliver power from an external power source to power source 736. This may be, for example, for the charging of power source 736. Power circuitry 737 may perform any formatting, converting, or other modification to the power from power source 736 to make the power suitable for the respective components of WD 710 to which power is supplied.

Figure 8:
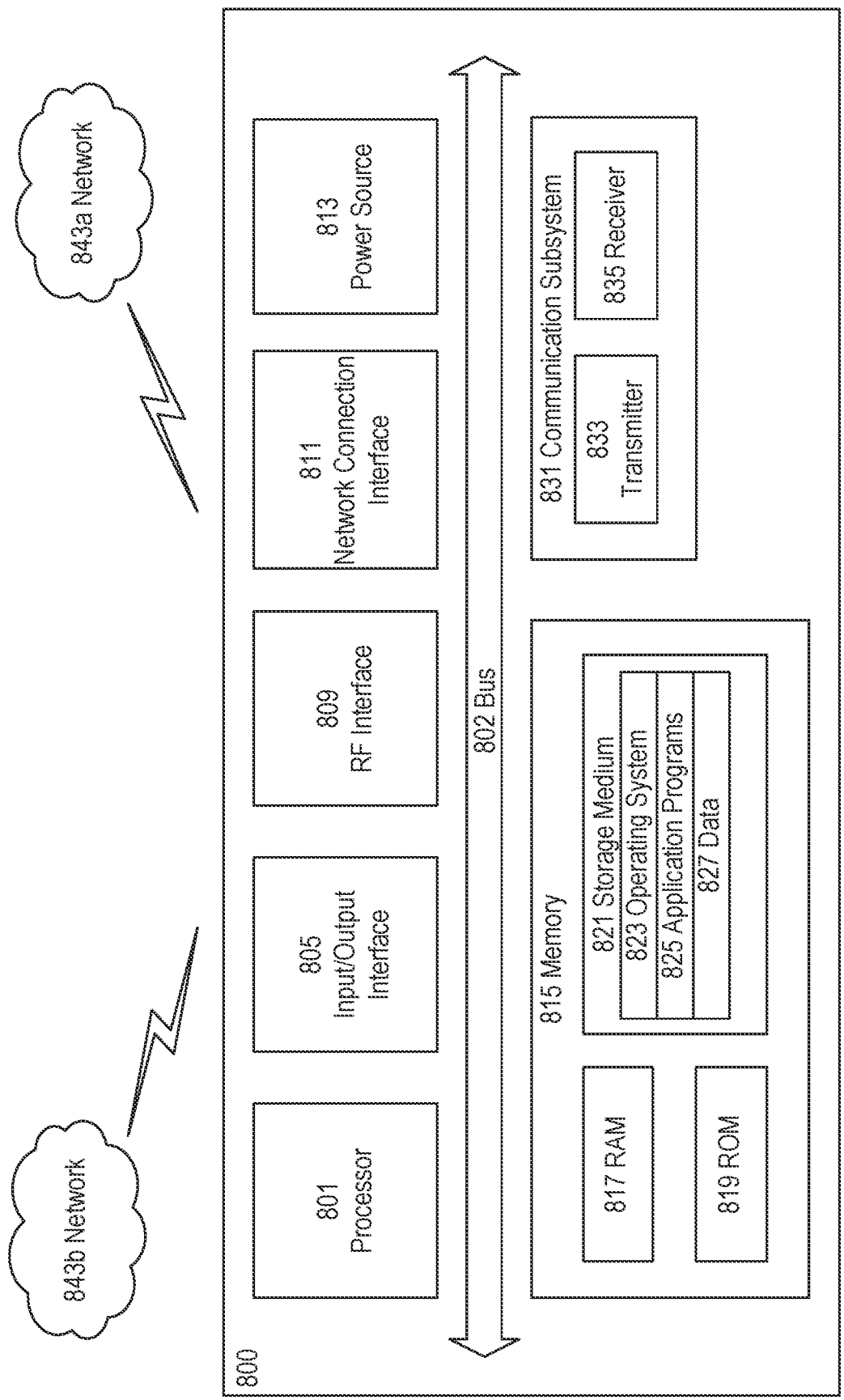
FIG. 8 shows a User Equipment in accordance with some embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 8200 may be any UE identified by the $3^{rd}$ Generation Partnership Project (3GPP), including a NB-IoT UE, a machine type communication (MTC) UE, and/or an enhanced MTC (eMTC) UE. UE 800, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 800 includes processing circuitry 801 that is operatively coupled to input/output interface 805, radio frequency (RF) interface 809, network connection interface 811, memory 815 including random access memory (RAM) 817, read-only memory (ROM) 819, and storage medium 821 or the like, communication subsystem 831, power source 833, and/or any other component, or any combination thereof. Storage medium 821 includes operating system 823, application program 825, and data 827. In other embodiments, storage medium 821 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 801 may be configured to process computer instructions and data. Processing circuitry 801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 801 may include two central processing units (CPUs). Data may be information in a form suitable for use by a computer.

In the depicted embodiment, input/output interface 805 may be configured to provide a communication interface to an input device, output device, or input and output device. UE 800 may be configured to use an output device via input/output interface 805. An output device may use the same type of interface port as an input device. For example, a USB port may be used to provide input to and output from UE 800. The output device may be a speaker, a sound card, a video card, a display, a monitor, a printer, an actuator, an emitter, a smartcard, another output device, or any combination thereof. UE 800 may be configured to use an input device via input/output interface 805 to allow a user to capture information into UE 800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 809 may be configured to provide a communication interface to RF components such as a transmitter, a receiver, and an antenna. Network connection interface 811 may be configured to provide a communication interface to network 843a. Network 843a may encompass wired and/or wireless networks such as a local-area network (LAN), a wide-area network (WAN), a computer network, a wireless network, a telecommunications network, another like network or any combination thereof. For example, network 843a may comprise a Wi-Fi network. Network connection interface 811 may be configured to include a receiver and a transmitter interface used to communicate with one or more other devices over a communication network according to one or more communication protocols, such as Ethernet, TCP/IP, SONET, ATM, or the like. Network connection interface 811 may implement receiver and transmitter functionality appropriate to the communication network links (e.g., optical, electrical, and the like). The transmitter and receiver functions may share circuit components, software or firmware, or alternatively may be implemented separately.

RAM 817 may be configured to interface via bus 802 to processing circuitry 801 to provide storage or caching of data or computer instructions during the execution of software programs such as the operating system, application programs, and device drivers. ROM 819 may be configured to provide computer instructions or data to processing circuitry 801. For example, ROM 819 may be configured to store invariant low-level system code or data for basic system functions such as basic input and output (I/O), startup, or reception of keystrokes from a keyboard that are stored in a non-volatile memory. Storage medium 821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 821 may be configured to include operating system 823, application program 825 such as a web browser application, a widget or gadget engine or another application, and data file 827. Storage medium 821 may store, for use by UE 800, any of a variety of various operating systems or combinations of operating systems.

Storage medium 821 may be configured to include a number of physical drive units, such as redundant array of independent disks (RAID), floppy disk drive, flash memory, USB flash drive, external hard disk drive, thumb drive, pen drive, key drive, high-density digital versatile disc (HD- DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 821 may allow UE 800 to access computer-executable instructions, application programs or the like, stored on transitory or non-transitory memory media, to off-load data, or to upload data. An article of manufacture, such as one utilizing a communication system may be tangibly embodied in storage medium 821, which may comprise a device readable medium.

In FIG. 8, processing circuitry 801 may be configured to communicate with network 843*b* using communication subsystem 831. Network 843*a* and network 843*b* may be the same network or networks or different network or networks. Communication subsystem 831 may be configured to include one or more transceivers used to communicate with network 843*b*. For example, communication subsystem 831 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 833 and/or receiver 835 to implement transmitter or receiver functionality, respectively, appropriate to the RAN links (e.g., frequency allocations and the like). Further, transmitter 833 and receiver 835 of each transceiver may share circuit components, software or firmware, or alternatively may be implemented separately.

In the illustrated embodiment, the communication functions of communication subsystem 831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 831 may include cellular communication, Wi-Fi communication, Bluetooth communication, and GPS communication. Network 843*b* may encompass wired and/or wireless networks such as a local-area network (LAN), a wide-area network (WAN), a computer network, a wireless network, a telecommunications network, another like network or any combination thereof. For example, network 843*b* may be a cellular network, a Wi-Fi network, and/or a near-field network. Power source 813 may be configured to provide alternating current (AC) or direct current (DC) power to components of UE 800.

The features, benefits and/or functions described herein may be implemented in one of the components of UE 800 or partitioned across multiple components of UE 800. Further, the features, benefits, and/or functions described herein may be implemented in any combination of hardware, software or firmware. In one example, communication subsystem 831 may be configured to include any of the components described herein. Further, processing circuitry 801 may be configured to communicate with any of such components over bus 802. In another example, any of such components may be represented by program instructions stored in memory that when executed by processing circuitry 801 perform the corresponding functions described herein. In another example, the functionality of any of such components may be partitioned between processing circuitry 801 and communication subsystem 831. In another example, the non-computationally intensive functions of any of such components may be implemented in software or firmware and the computationally intensive functions may be implemented in hardware.

Figure 9:
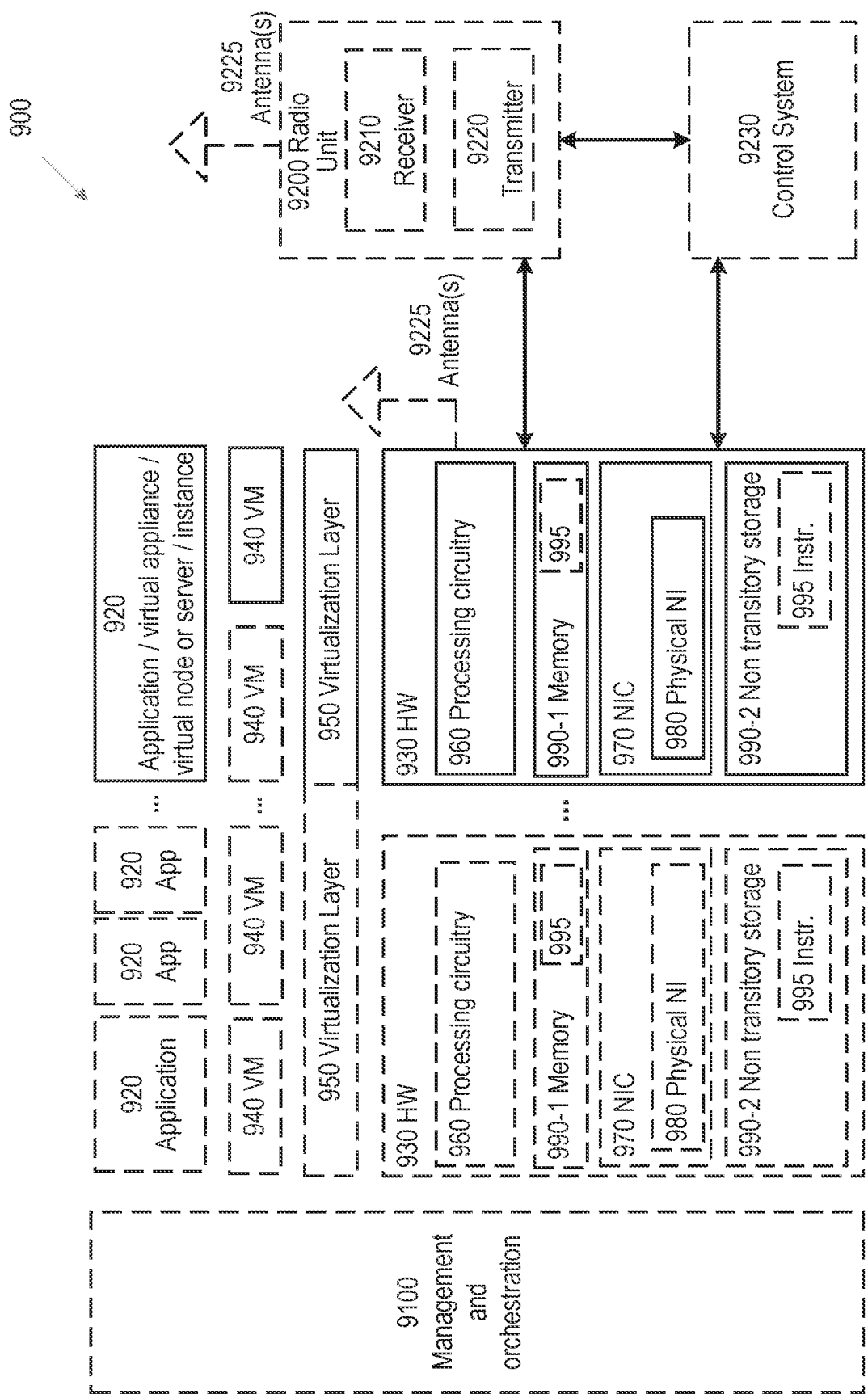
FIG. 9 shows a virtualization environment in accordance with some embodiments.

FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. Applications 920 are run in virtualization environment 900 which provides hardware 930 comprising processing circuitry 960 and memory 990. Memory 990 contains instructions 995 executable by processing circuitry 960 whereby application 920 is operative to provide one or more of the features, benefits, and/or functions disclosed herein.

Virtualization environment 900, comprises general-purpose or special-purpose network hardware devices 930 comprising a set of one or more processors or processing circuitry 960, which may be commercial off-the-shelf (COTS) processors, dedicated Application Specific Integrated Circuits (ASICs), or any other type of processing circuitry including digital or analog hardware components or special purpose processors. Each hardware device may comprise memory 990-1 which may be non-persistent memory for temporarily storing instructions 995 or software executed by processing circuitry 960. Each hardware device may comprise one or more network interface controllers (NICs) 970, also known as network interface cards, which include physical network interface 980. Each hardware device may also include non-transitory, persistent, machine-readable storage media 990-2 having stored therein software 995 and/or instructions executable by processing circuitry 960. Software 995 may include any type of software including software for instantiating one or more virtualization layers 950 (also referred to as hypervisors), software to execute virtual machines 940 as well as software allowing it to execute functions, features and/or benefits described in relation with some embodiments described herein.

Virtual machines 940, comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940, and the implementations may be made in different ways.

During operation, processing circuitry 960 executes software 995 to instantiate the hypervisor or virtualization layer 950, which may sometimes be referred to as a virtual machine monitor (VMM). Virtualization layer 950 may present a virtual operating platform that appears like networking hardware to virtual machine 940.

As shown in FIG. 9, hardware 930 may be a standalone network node with generic or specific components. Hardware 930 may comprise antenna 9225 and may implement some functions via virtualization. Alternatively, hardware 930 may be part of a larger cluster of hardware (e.g. such as in a data center or customer premise equipment (CPE)) where many hardware nodes work together and are managed via management and orchestration (MANO) 9100, which, among others, oversees lifecycle management of applications 920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 940 may be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network elements (VNE).

Still in the context of NFV, Virtual Network Function (VNF) is responsible for handling specific network functions that run in one or more virtual machines 940 on top of hardware networking infrastructure 930 and corresponds to application 920 in FIG. 9.

In some embodiments, one or more radio units 9200 that each include one or more transmitters 9220 and one or more receivers 9210 may be coupled to one or more antennas 9225. Radio units 9200 may communicate directly with hardware nodes 930 via one or more appropriate network interfaces and may be used in combination with the virtual components to provide a virtual node with radio capabilities, such as a radio access node or a base station.

In some embodiments, some signalling can be effected with the use of control system 9230 which may alternatively be used for communication between the hardware nodes 930 and radio units 9200.

Figure 10:
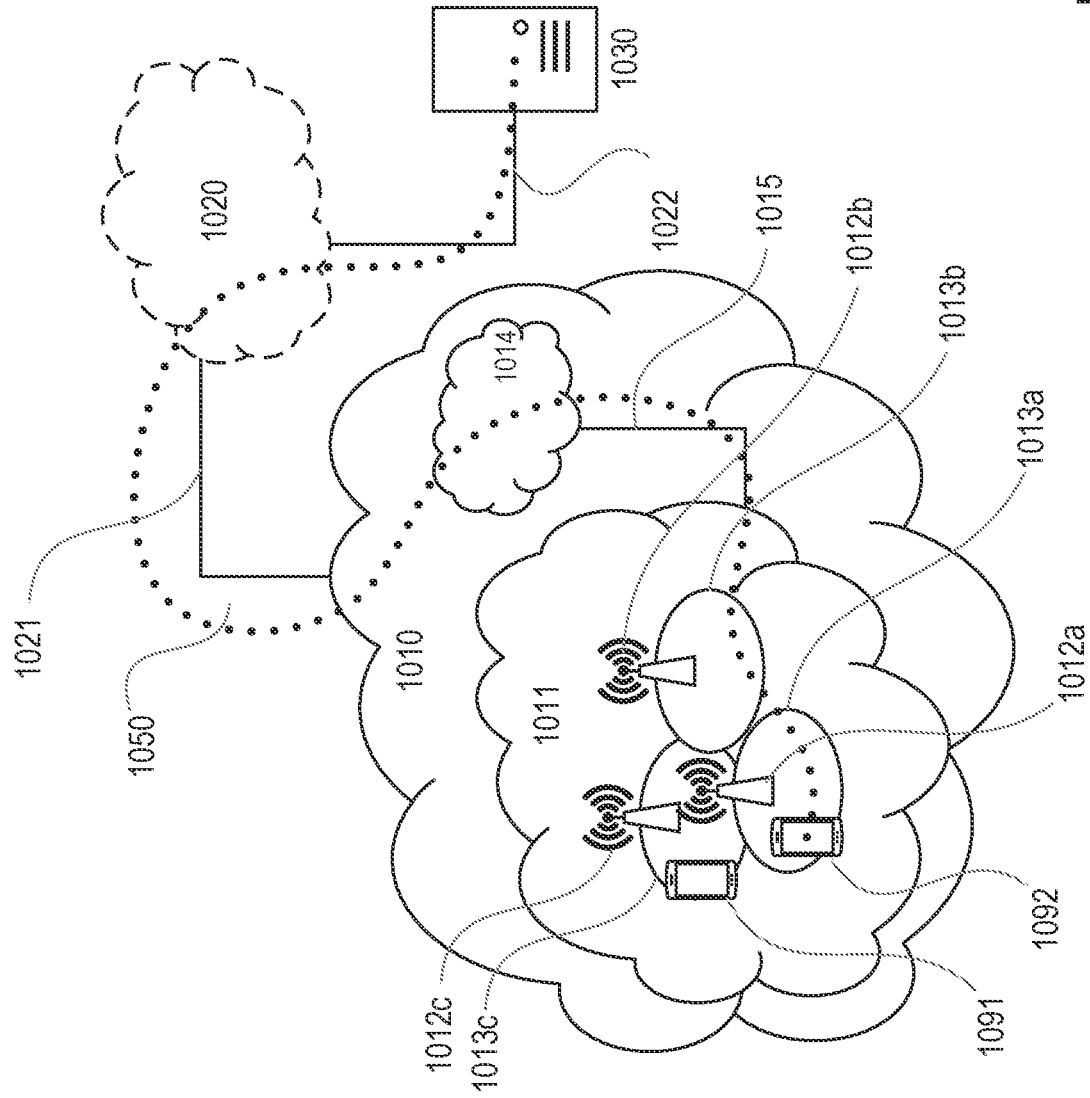
FIG. 10 shows the connection of a telecommunication network via an intermediate network to a host computer in accordance with some embodiments.

FIG. 10 shows a telecommunication network connected via an intermediate network to a host computer in accordance with some embodiments. With reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A first UE 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Figure 11:
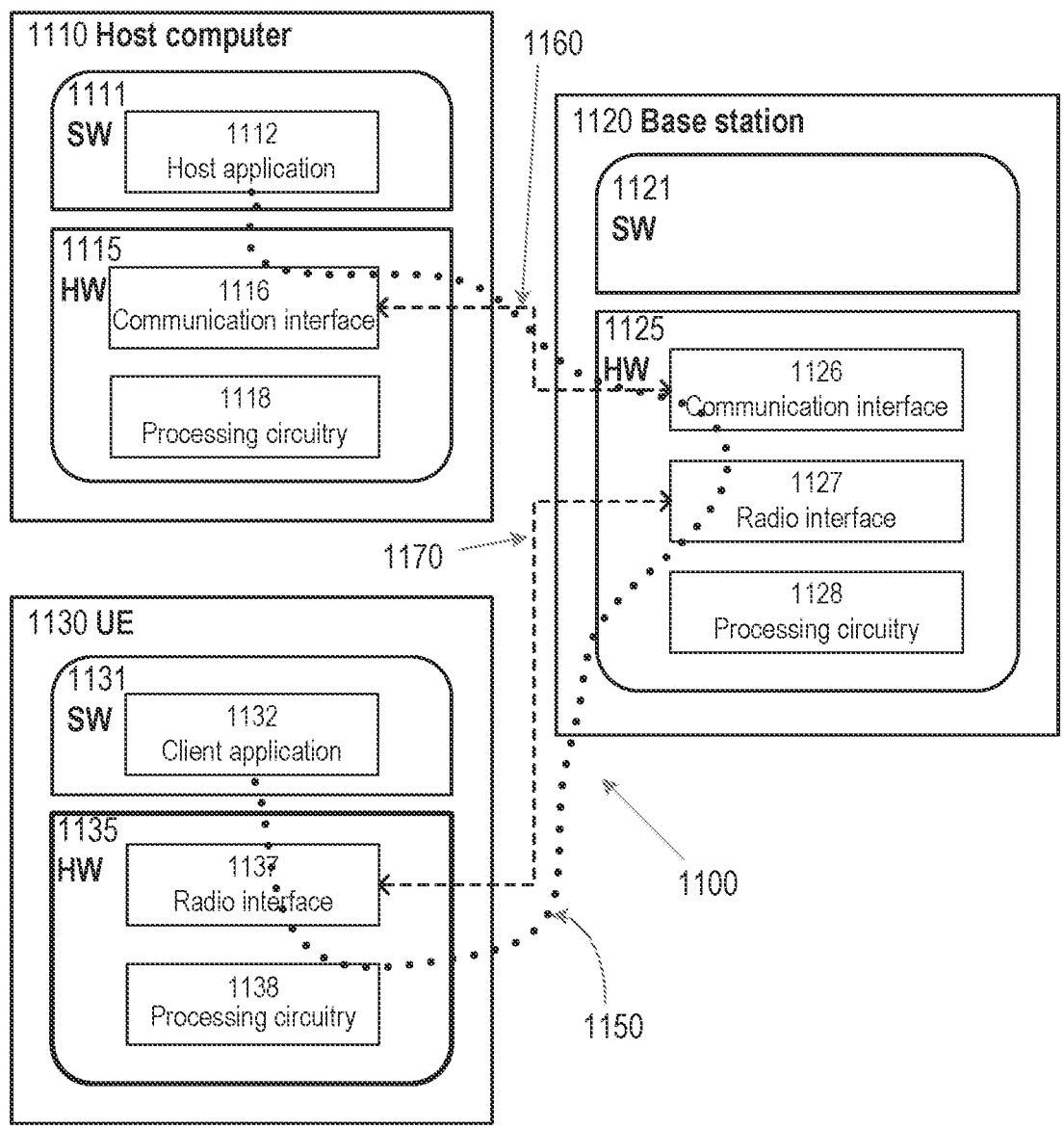
FIG. 11 shows a host computer communicating via a base station with a user equipment over a partially wireless connection in accordance with some embodiments.

FIG. 11 shows a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 11. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

It is noted that host computer 1110, base station 1120 and UE 1130 illustrated in FIG. 11 may be similar or identical to host computer 1030, one of base stations 1012a, 1012b, 1012c and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve the data rate, latency, and/or power consumption, by improving the random access procedure, and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

Figure 12:
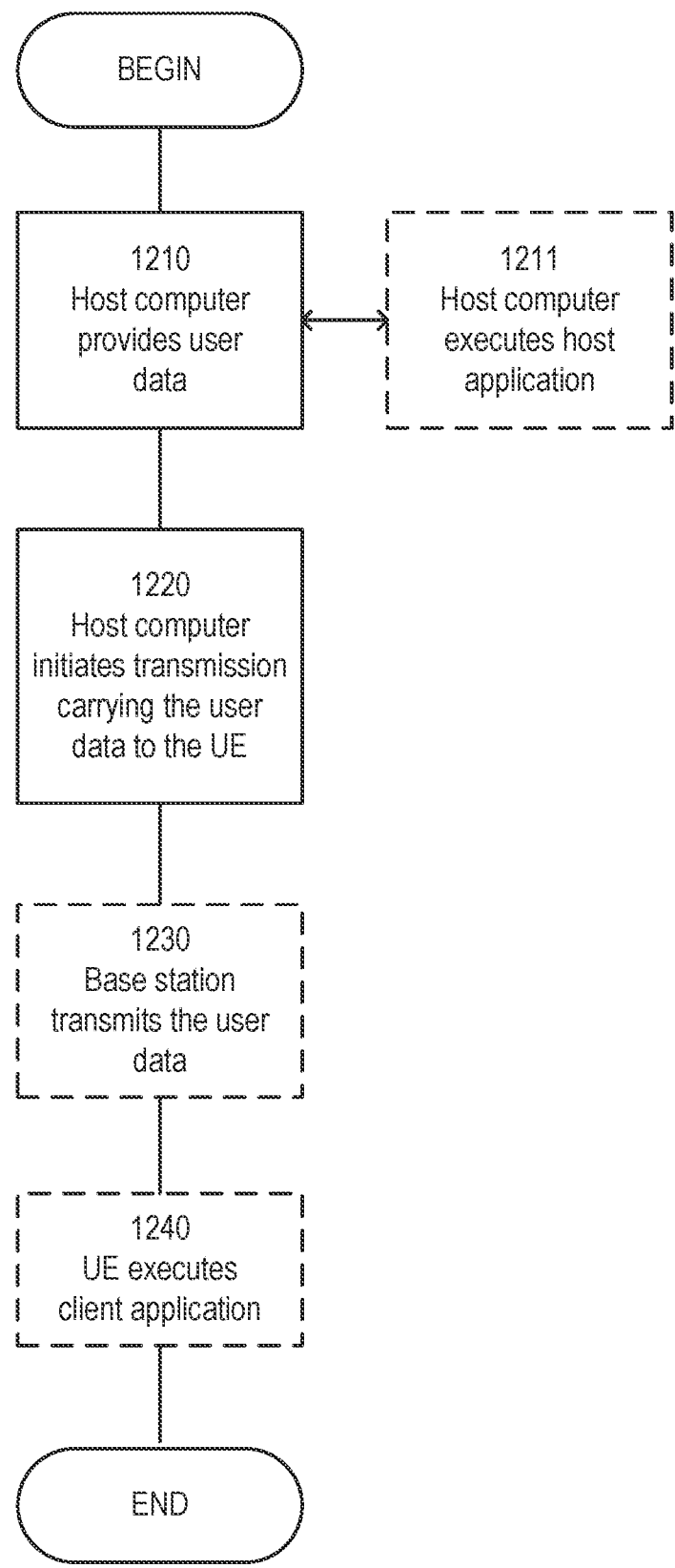
FIG. 12 shows methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

Figure 13:
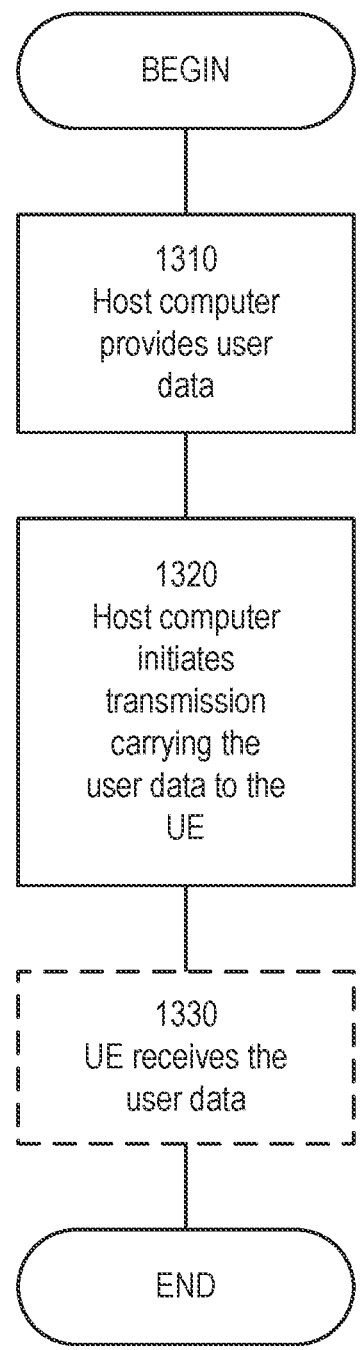
FIG. 13 shows methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figure 14:
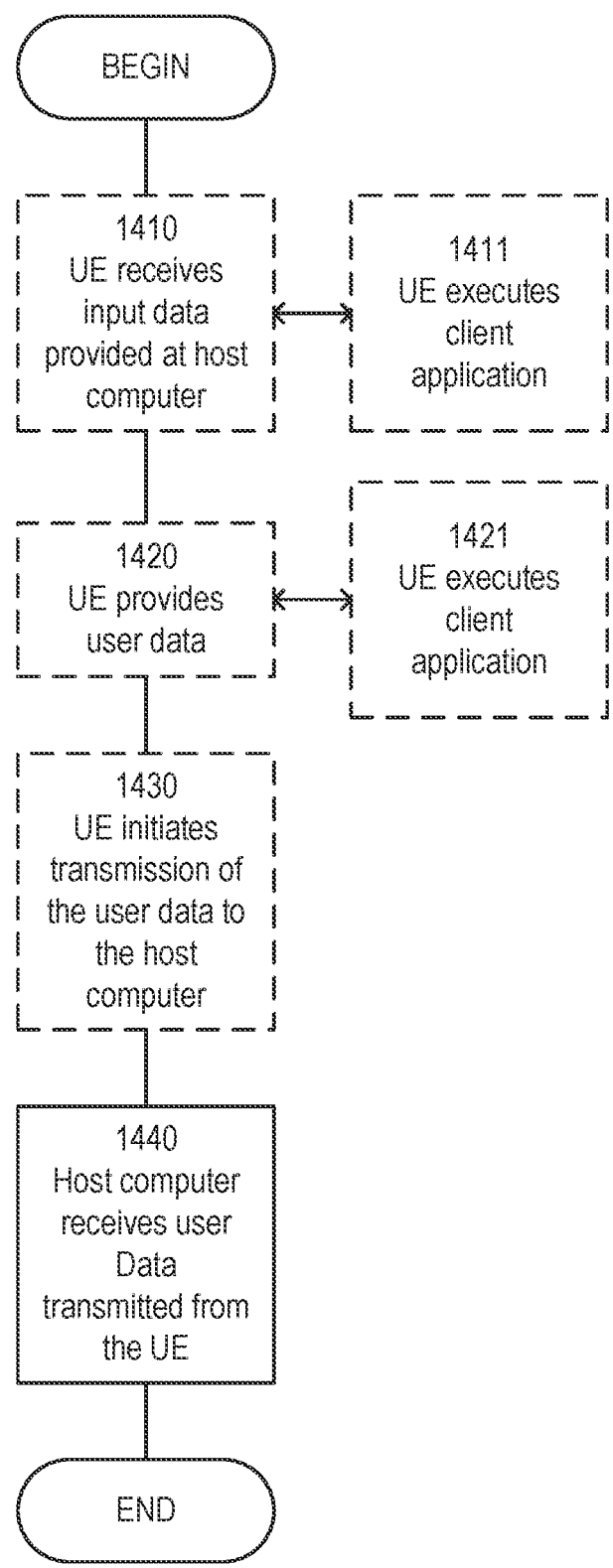
FIG. 14 shows methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

Figure 15:
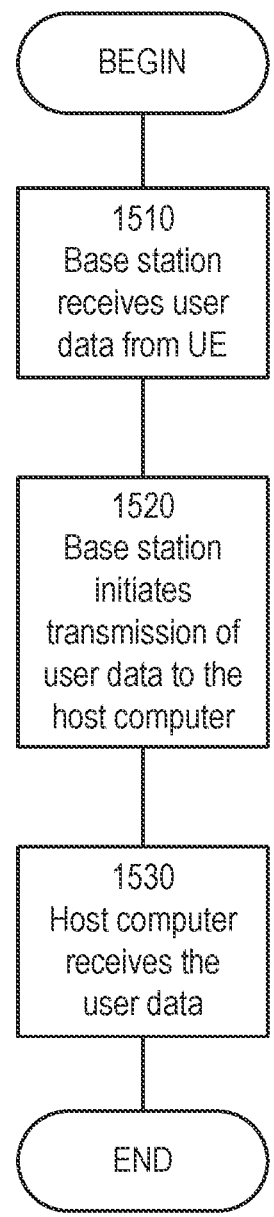
FIG. 15 shows methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 16:
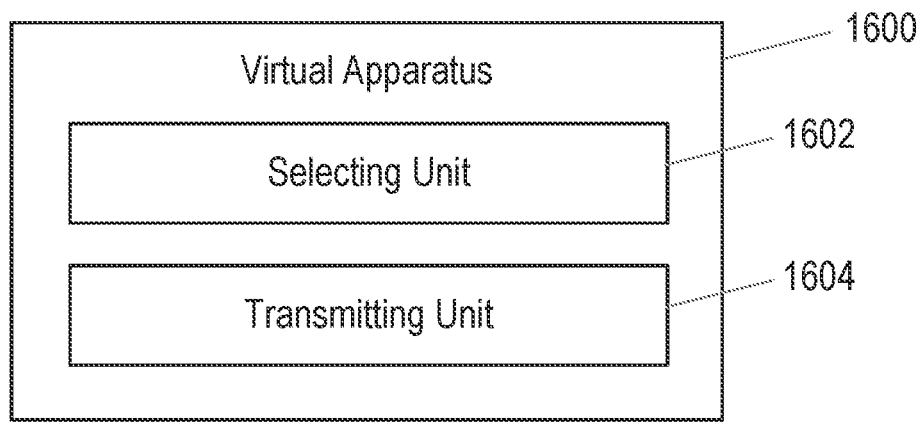
FIG. 16 illustrates a virtualization apparatus in accordance with some embodiments.

FIG. 16 is a schematic block diagram illustrating an apparatus 1600 in a wireless network (for example, the wireless network shown in FIG. 7). The apparatus may be implemented in a wireless device or network node (e.g., wireless device 710 or network node 760 shown in FIG. 7). Apparatus 1600 is operable to carry out the example method described with reference to FIG. 2 and possibly any other processes or methods disclosed herein. It is also to be understood that the method of FIG. 2 is not necessarily carried out solely by apparatus 1600. At least some operations of the method can be performed by one or more other entities.

Virtual Apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause selecting unit 1602, and transmitting unit 1604, and any other suitable units of apparatus 1600 to perform corresponding functions according one or more embodiments of the present disclosure.

As illustrated in FIG. 16, apparatus 1600 includes selecting unit 1602, for selecting at least one PRACH occasion, and transmitting unit 1604, for performing a two-step random access procedure comprising transmitting a preamble in at least one Physical Random Access Channel, PRACH, occasion, and transmitting a Physical Uplink Shared Channel, PUSCH, wherein the at least one PRACH occasion for transmitting the preamble is selected to ensure that a gap between transmitting the preamble and transmitting the message on the PUSCH is less than a predetermined duration.

Figure 17:
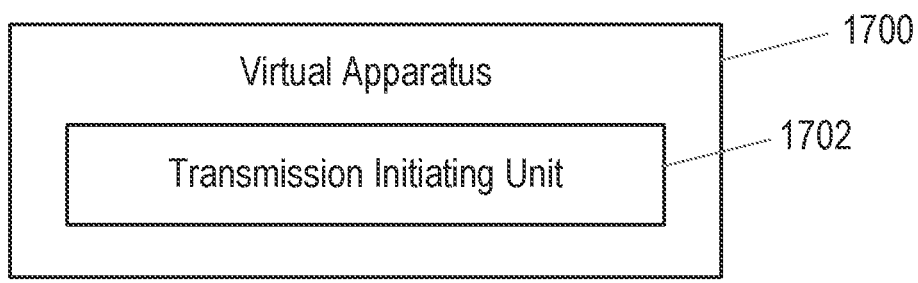
FIG. 17 illustrates a virtualization apparatus in accordance with some embodiments.

FIG. 17 is a schematic block diagram illustrating an apparatus 1700 in a wireless network (for example, the wireless network shown in FIG. 7). The apparatus may be implemented in a wireless device or network node (e.g., wireless device 710 or network node 760 shown in FIG. 7). Apparatus 1700 is operable to carry out the example method described with reference to FIG. 4 and possibly any other processes or methods disclosed herein. It is also to be understood that the method of FIG. 4 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the transmission initiating unit 1702 and any other suitable units of apparatus 1700 to perform corresponding functions according to one or more embodiments of the present disclosure.

As illustrated in FIG. 17, apparatus 1700 includes a transmission initiating unit 1702, which is configured to cause a message to be sent to a wireless device, said message causing the wireless device to use a two-step random access procedure when accessing a cell served by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1x RTT CDMA2000 1x Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCA Clear channel assessment
CCCH SDU Common Control Channel SDU
CDMA Code Division Multiplexing Access
CGI Cell Global Identifier
CIR Channel Impulse Response
COT Channel occupancy time
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
CWS Contention window size
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
ED Energy detection
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LBT Listen before talk
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MCOT Maximum channel occupancy time
MDT Minimization of Drive Tests
MIB Master Information Block
MME Mobility Management Entity
MSC Mobile Switching Center
Msg Message
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RA Random access
RACH Random access channel
RAN Random Access Network
RAR Random access response
RAT Radio Access Technology
RLM Radio Link Management
RNC Radio Network Controller
RNTI Radio Network Temporary Identifier
RO RACH occasion
RRC Radio Resource Control
RRM Radio Resource Management
RS Reference Signal
RSCP Received Signal Code Power RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SF Spreading Factor
SFN System Frame Number
SGW Serving Gateway
SI System Information
SIB system Information Block
SNR Signal to Noise Ratio
SON Self Optimized Network
SS Synchronization Signal
SSS Secondary Synchronization Signal
TA Timing alignment
TDD Time Division Duplex
TDM Time division multiplexing
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wireless Local Area Network

The invention claimed is:

1. A method performed by a wireless device for accessing a network using a two-step random access ("RA") procedure that includes transmitting a preamble in at least one Physical Random Access Channel ("PRACH") occasion and transmitting a Physical Uplink Shared Channel ("PUSCH"), the method comprising:
determining a position of the at least one PRACH occasion to ensure that a gap between transmitting the preamble and transmitting the PUSCH is less than a predetermined duration;
transmitting the preamble in the at least one PRACH occasion; and
transmitting the PUSCH less than the predetermined duration after transmitting the preamble,
wherein the gap is greater than zero, and
wherein the predetermined duration is a maximum gap in a channel occupancy time.

2. The method of claim 1, wherein determining the position of the at least one PRACH occasion comprises determining the position of the at least one PRACH occasion to be the last PRACH occasion within a slot before the PUSCH.

3. The method of claim 2, wherein determining the position of the at least one PRACH occasion comprises determining the position of the at least one PRACH occasion to be the last PRACH occasion within a first slot for transmitting the preamble, and
wherein transmitting the PUSCH comprises transmitting the PUSCH within a second slot immediately following the first slot.

4. The method of claim 2, wherein transmitting the PUSCH comprises transmitting the PUSCH starting at a starting symbol after a first symbol of a first slot, and
wherein determining the position of the at least one PRACH occasion to be the last PRACH occasion comprises determining the position of the at least one PRACH occasion to be in the first slot such that it finishes before the starting symbol for transmitting the preamble.

5. The method of claim 1, wherein transmitting the preamble in the at least one PRACH occasion comprises transmitting the preamble in a PRACH occasion within a first slot and repeating transmission of the preamble in at least one subsequent PRACH occasion within the first slot.

6. The method of claim 5, wherein performing the two-step random access procedure further comprises at least one of:
repeating transmission of the preamble in each subsequent PRACH occasion within the first slot, and transmitting the PUSCH within a second slot immediately following the first slot; and
transmitting the PUSCH starting at a starting symbol after the first symbol of a first slot, transmitting the preamble in a PRACH occasion before the starting symbol within the first slot, and repeating transmission of the preamble in at least one subsequent PRACH occasion until the last PRACH occasion in the first slot that finishes before the starting symbol.

7. The method of claim 1, wherein transmitting the preamble in the at least one PRACH occasion comprises transmitting the preamble in a PRACH occasion within a first slot,
the method further comprising:
extending a duration of the preamble.

8. The method of claim 7, wherein extending the duration of the preamble comprises extending the duration of the preamble by cyclically repeating a preamble sequence.

9. The method of claim 7, wherein extending the duration of the preamble comprises extending a duration of the preamble until a time less than the predetermined duration before an end of the first slot, and
wherein transmitting the PUCSH comprises transmitting the PUSCH within a second slot immediately following the first slot.

10. The method of claim 7, wherein transmitting the PUCSH comprises transmitting the PUSCH starting at a starting symbol after the first symbol of a first slot,
wherein transmitting the preamble comprises transmitting the preamble in a PRACH occasion before the starting symbol within the first slot, and
wherein extending the duration of the preamble comprises extending the duration of the preamble until a time less than the predetermined duration before the starting symbol.

11. The method of claim 1, wherein transmitting the preamble in the at least one PRACH occasion comprises:
transmitting the preamble in a PRACH occasion within a first slot; and
repeating transmission of the preamble in at least one subsequent PRACH occasion within the first slot,
the method further comprising:
extending a duration of at least one transmission of the preamble.

12. The method of claim 11, wherein extending the duration of at least one transmission of the preamble comprises extending the duration of at least one transmission of the preamble by cyclically repeating a preamble sequence.

13. The method of claim 1, wherein transmitting the preamble at the at least one PRACH occasion comprises transmitting the preamble starting at a first symbol in a first slot such that a gap between an end of the preamble and an end of the first slot is less than the predetermined duration.

14. The method of claim 1, further comprising:
receiving signaling configuring the wireless device to perform the two-step RA procedure, the signaling indicating that the wireless device should perform the two-step A procedure in preference to a four-step RA procedure, or identifying resources in which to transmit the PUSCH.

15. The method of claim 1, wherein transmitting the PUSCH comprises transmitting the PUSCH starting at a starting symbol after a first symbol of a first slot, and
wherein transmitting the preamble comprises transmitting the preamble in a PRACH occasion before the starting symbol within the first slot,
the method further comprising:
extending the duration of the preamble until a time that is less than a predetermined duration before the starting symbol to ensure that a gap between transmitting the preamble and transmitting the PUSCH is less than the predetermined duration.

16. A wireless device comprising:
processing circuitry; and
memory coupled to the processing circuitry and having instructions stored therein that are executable by the processing circuity to cause the wireless device to perform operations for accessing a network using a two-step random access ("RA") procedure that includes transmitting a preamble in at least one Physical Random Access Channel ("PRACH") occasion and transmitting a Physical Uplink Shared Channel ("PUSCH"), the operations comprising:
determining a position of the at least one PRACH occasion to ensure that a gap between transmitting the preamble and transmitting the PUSCH is less than a predetermined duration;
transmitting the preamble in the at least one PRACH occasion; and
transmitting the PUSCH less than the predetermined duration after transmitting the preamble,
wherein the gap is greater than zero, and
wherein the predetermined duration is a maximum gap in a channel occupancy time.

17. A method of operating a base station for controlling a two-step random access ("RA") procedure that includes a wireless device transmitting a preamble in at least one Physical Random Access Channel ("PRACH") occasion and transmitting a Physical Uplink Shared Channel ("PUSCH"), the method comprising:
configuring the wireless device to determine a position of the at least one PRACH occasion to ensure that a gap between the wireless device transmitting the preamble and transmitting the PUSCH is less than a predetermined duration; and
receiving the preamble in the at least one PRACH occasion,
wherein the gap is greater than zero, and
wherein the predetermined duration is a maximum gap in a channel occupancy time.

18. The method of claim 17, wherein configuring the wireless device comprises at least one of:
sending a message within broadcast system information; and
sending a message to the wireless device in dedicated radio resource control ("RRC") signaling.

19. The method of claim 18, wherein the message is carried in RACH-ConfigCommon, or
wherein the message includes and identifier of the PRACH preamble and allows identification of resources to be used for the PUSCH transmission.

20. A base station comprising:
processing circuitry; and
memory coupled to the processing circuitry and having instructions stored therein that are executable by the processing circuity to cause the base station to perform operations for controlling a two-step random access ("RA") procedure that includes a wireless device transmitting a preamble in at least one Physical Random Access Channel ("PRACH") occasion and transmitting a Physical Uplink Shared Channel ("PUSCH"), the operations comprising:
configuring the wireless device to determine a position of the at least one PRACH occasion to ensure that a gap between the wireless device transmitting the preamble and transmitting the PUSCH is less than a predetermined duration; and
receiving the preamble in the at least one PRACH occasion,
wherein the gap is greater than zero, and
wherein the predetermined duration is a maximum gap in a channel occupancy time.

* * * * *